US012499150B2

(12) United States Patent
Yang et al.

(10) Patent No.: US 12,499,150 B2
(45) Date of Patent: Dec. 16, 2025

(54) IMAGE ENCODER TRAINING METHOD AND APPARATUS, DEVICE, AND MEDIUM

(71) Applicant: Tencent Technology (Shenzhen) Company Limited, Shenzhen (CN)

(72) Inventors: Sen Yang, Shenzhen (CN); Jinxi Xiang, Shenzhen (CN); Jun Zhang, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/642,807

(22) Filed: Apr. 22, 2024

(65) Prior Publication Data

US 2024/0273134 A1 Aug. 15, 2024

Related U.S. Application Data

(63) Continuation of application No. PCT/CN2023/088875, filed on Apr. 18, 2023.

(30) Foreign Application Priority Data

May 16, 2022 (CN) ......................... 202210531184.9

(51) Int. Cl.
*G06V 10/762* (2022.01)
*G06F 16/535* (2019.01)
(Continued)

(52) U.S. Cl.
CPC ............ *G06F 16/535* (2019.01); *G06F 16/55* (2019.01); *G06F 16/56* (2019.01); *G06V 10/26* (2022.01); *G06V 10/46* (2022.01); *G06V 10/761* (2022.01); *G06V 10/762* (2022.01); *G06V 10/764* (2022.01); *G06V 10/774* (2022.01); *G06V 2201/03* (2022.01)

(58) Field of Classification Search
None
See application file for complete search history.

(56) References Cited

U.S. PATENT DOCUMENTS

2023/0014668 A1* 1/2023 Hosseini ............... G06T 7/0014

FOREIGN PATENT DOCUMENTS

CN 106874489 A 6/2017
CN 111158737 A * 5/2020 ............. G06F 8/658
(Continued)

OTHER PUBLICATIONS

Tencent Technology, ISR, PCT/CN2023/088875, Jun. 23, 2023, 3 pgs.

(Continued)

*Primary Examiner* — Tuankhanh D Phan
(74) *Attorney, Agent, or Firm* — Morgan, Lewis & Bockius LLP

(57) ABSTRACT

Provided is a method for searching for a whole slide image performed by a computer device, which relate to the field of artificial intelligence. The method includes: cropping a whole slide image into a plurality of tissue images; generating, through an image encoder, image feature vectors respectively corresponding to the plurality of tissue images; clustering the image feature vectors respectively corresponding to the plurality of tissue images, to determine at least one key image from the plurality of tissue images; querying, based on image feature vectors respectively corresponding to the at least one key image, a database to obtain at least one target image package corresponding to the at least one key image; and determining a whole slide image to which at least one candidate tissue image comprised in the at least one target image package respectively belongs as a final search result.

17 Claims, 15 Drawing Sheets

Training framework based on a weight loss function

Image X
Second image (image $X_p$)
First image (image $X_k$)
Third image (image $X_q$)
Second image encoder (encoder h)
First image encoder (encoder f)
Third image encoder (encoder h)
Slow update
Slow update
$h_p$
$f_k$
$h_q$
First MLP
Second MLP
$g_{p2}$
$g_{q1}$
Weight loss function
Sub-container of a negative sample
Pushed onto a stack
Popped from the stack
1
i
Q

(51) Int. Cl.

| | |
|---|---|
| ***G06F 16/55*** | (2019.01) |
| ***G06F 16/56*** | (2019.01) |
| ***G06V 10/26*** | (2022.01) |
| ***G06V 10/46*** | (2022.01) |
| ***G06V 10/74*** | (2022.01) |
| ***G06V 10/764*** | (2022.01) |
| *G06V 10/774* | (2022.01) |

(56) References Cited

FOREIGN PATENT DOCUMENTS

| | | | | |
|---|---|---|---|---|
| CN | 113435545 A | | 9/2021 | |
| CN | 113705811 A | | 11/2021 | |
| CN | 113822325 A | | 12/2021 | |
| CN | 113901327 A | | 1/2022 | |
| CN | 113971751 A | | 1/2022 | |
| CN | 115115855 A | | 9/2022 | |
| EP | 3336763 A1 | | 6/2018 | |
| WO | WO 2021139316 A1 | | 7/2021 | |
| WO | WO-2022251400 A1 | * | 12/2022 | ........... G06T 7/0012 |

OTHER PUBLICATIONS

Tencent Technology, WO, PCT/CN2023/088875, Jun. 23, 2023, 5 pgs.

Tencent Technology, IPRP, PCT /CN2023/097408, Nov. 7, 2024, 6 pgs.

* cited by examiner

IMAGE ENCODER TRAINING METHOD AND APPARATUS, DEVICE, AND MEDIUM

CROSS-REFERENCE TO RELATED APPLICATIONS

This application is a continuation application of PCT Patent Application No. PCT/CN2023/088875, entitled "IMAGE ENCODER TRAINING METHOD AND APPARATUS, DEVICE, AND MEDIUM" filed on Apr. 18, 2023, which claims priority to Chinese Patent Application No. 202210531184.9, entitled "IMAGE ENCODER TRAINING METHOD AND APPARATUS, DEVICE, AND MEDIUM" filed on May 16, 2022, all of which is incorporated herein by reference in its entirety.

The application relates to U.S. patent application Ser. No. 18/642,802, entitled "IMAGE ENCODER TRAINING METHOD AND APPARATUS, DEVICE, AND MEDIUM" filed on Apr. 22, 2024, which is incorporated herein by reference in its entirety.

FIELD OF THE TECHNOLOGY

This application relates to the field of artificial intelligence, and in particular, to an image encoder training method and apparatus, a device, and a medium.

BACKGROUND OF THE DISCLOSURE

In the medical field, there is a scenario in which a whole slide image (WSI) searches for a similar whole slide image. Each whole slide image (a large image) includes a large quantity of tissue pathological images (small images).

In the related art, a small image with the best representative capability in the large image is used to represent an entire large image, a database is searched according to a feature vector of the small image with the best representative capability for a target small image most similar to the small image, and a large image corresponding to the target small image is used as a final search result. In the foregoing process, an image encoder is required for extracting the feature vector of the small image. In the related art, when the image encoder is trained, training is performed through contrastive learning. Contrastive learning aims to learn a common feature between an anchor image and a positive sample, and distinguish different features between the anchor image and a negative sample (which is often referred to as pulling the anchor image and the positive sample close to each other, and pulling the anchor image and the negative sample far away from each other).

In the related art, when the image encoder is trained through contrastive learning, for an image X, an image X1 and an image X2 obtained by separately performing data enhancement on the image X for two times are used as a pair of positive samples, and the image X and an image Y are used as a pair of negative samples. However, positive and negative sample assumption in the related art is inappropriate in a special scenario. In a scenario, when a tissue region to which a small image selected from one WSI belongs is the same as a tissue region to which a small image selected from another WSI belongs, the two small images are considered as a pair of negative samples. In another scenario, when two small images whose locations are adjacent are selected from the same WSI, the two small images are also considered as a pair of negative samples. Apparently, the two small images selected in the two scenarios shall form a positive sample pair, and during training of the image encoder in the related art, positive samples may be mistakenly pulled away. Due to wrong selection of positive and negative sample pairs, a training direction of the image encoder may be wrong. In this case, wrong positive and negative samples are used to extract features from an image by the image encoder on which training is performed, and consequently, precision of an extracted image feature is relatively low, which is not conducive to a downstream search task.

SUMMARY

This application provides an image encoder training method and apparatus, a device, and a medium, which can improve precision of an image feature extracted by an image encoder. The technical solutions are as follows.

According to one aspect of this application, a method for searching for a whole slide image is performed by a computer device, the method including:

- cropping the whole slide image into a plurality of tissue images;
- generating, through an image encoder, image feature vectors respectively corresponding to the plurality of tissue images;
- clustering the image feature vectors respectively corresponding to the plurality of tissue images, to determine at least one key image from the plurality of tissue images;
- querying, based on image feature vectors respectively corresponding to the at least one key image, a database to obtain at least one target image package corresponding to the at least one key image; and
- determining a whole slide image to which at least one candidate tissue image included in the at least one target image package respectively belongs as a final search result.

According to another aspect of this application, a computer device is provided, including a processor and a memory, the memory having a computer program stored therein, the computer program being loaded and executed by the processor and causing the computer device to implement the method for searching for a whole slide image.

According to yet another aspect of this application, a non-transitory computer-readable storage medium is provided, having a computer program stored therein, the computer program being loaded and executed by a processor of a computer device and causing the computer device to implement the method for searching for a whole slide image.

The technical solutions provided in the embodiments of this application produce at least the following beneficial effects:

Weights are assigned to negative samples identified in the related art, and a "negative degree" of the negative samples is further distinguished between the negative samples, so that a loss value used in contrastive learning (also referred to as a contrastive learning paradigm) can more accurately pull anchor images and the negative samples away from each other, and the impact of potential false negative samples is reduced, thereby better training an image encoder. In this way, the image encoder obtained through training can better distinguish different features between the anchor images and the negative samples, thereby improving precision of an image feature extracted by the image encoder, and further improving accuracy of a result of a downstream search task.

DESCRIPTION OF EMBODIMENTS

To make objectives, technical solutions, and advantages of this application clearer, the following further describes implementations of this application in detail with reference to the accompanying drawings.

First, terms involved in the embodiments of this application are briefly introduced:

Whole slide image (WSI): The WSI is a visual digital image obtained by using a digital scanner to scan a conventional slide image to acquire a high-resolution image, and then using a computer to seamlessly splice acquired fragmented images. Through specific software, the WSI may be zoomed in and out in any ratio, movably browsed in any direction, and the like. A data volume of one WSI generally ranges from hundreds of megabytes (MB) to even several gigabytes (GB). In this application, the WSI is usually referred to as a large image for short. In the related art, processing on the WSI focuses on selection and analysis on a local tissue region in the WSI. In this application, the local tissue region in the WSI is generally referred to as a small image.

Figure 1:
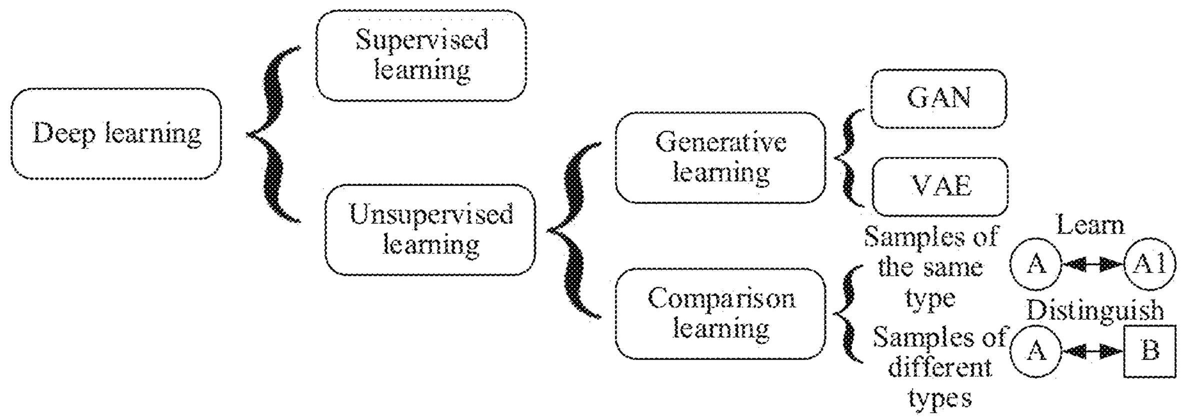
FIG. 1 is a schematic diagram of related description of contrastive learning according to an embodiment of this application.

Comparison learning (also referred to as contrastive learning): Referring to FIG. 1, deep learning may be classified into supervised learning and unsupervised learning according to whether data labeling is performed. Massive data needs to be labeled in the supervised learning, while autonomous discovery of a latent structure is allowed in the unsupervised learning. The unsupervised learning may be further classified into generative learning and comparison learning. The generative learning is represented by a method such as a self-encoder (for example, a GAN, a VAE, and the like), and data is generated by using data, so that the data is similar to training data on the whole or in terms of high-level semantics. For example, a plurality of images of horses in a training set are used to learn features of horses through a generative model, so that a new image of horses may be generated.

The comparison learning focuses on learning a common feature between samples of the same type and distinguishing different features between samples of different types. In the contrastive learning, the encoder is usually trained through a triple (anchor image, negative sample, and positive sample). As shown in FIG. 1, a circle A is an anchor image in the contrastive learning, a circle A1 is a positive sample in the contrastive learning, and a square B is a negative sample in the contrastive learning. The contrastive learning aims to use an encoder obtained through training to pull the circle A and the circle A1 to the close to each other and pull the circle A and the square B to be far away from each other. In other words, the encoder obtained through training supports similar encoding of data of the same type, and makes encoding results of data of different types as different as possible. In this application, a method for training an image encoder through contrastive learning is described.

Next, an implementation environment of this application is described below.

Figure 2:
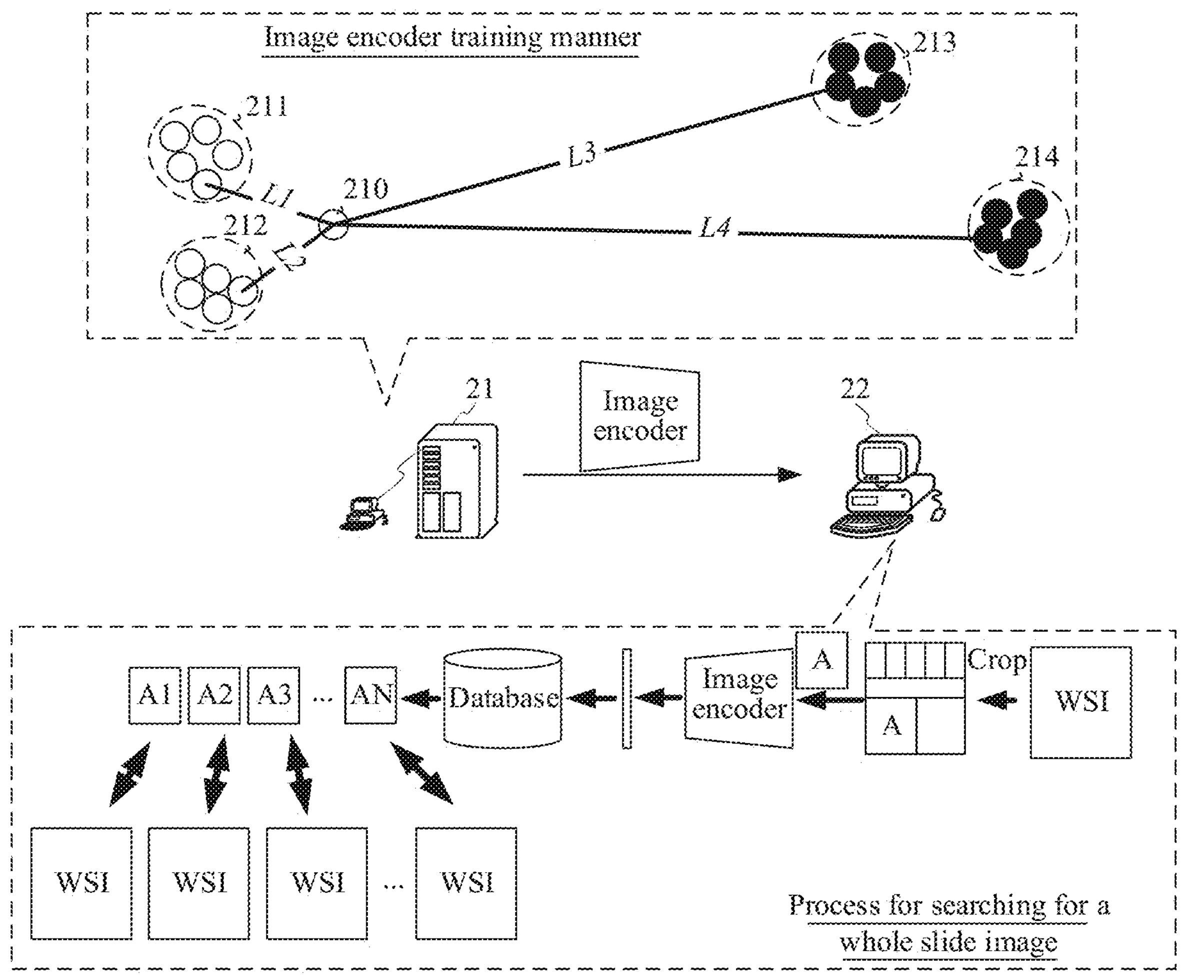
FIG. 2 is a schematic diagram of a computer system according to an embodiment of this application.

FIG. 2 is a schematic diagram of a computer system according to an exemplary embodiment. As shown in FIG. 2, a training device 21 of an image encoder is configured to train the image encoder. The training device 21 of the image encoder sends the image encoder to a use device 22 of the image encoder, and the use device 22 of the image encoder searches for a whole slide image through the image encoder.

Image encoder training phase: As shown in FIG. 2, the image encoder is trained through contrastive learning, and a distance between an anchor image 210 and a positive sample is less than a distance between the anchor image 210 and a negative sample, where in FIG. 2, the positive sample includes a positive sample class cluster 211 and positive sample class cluster 212 that are obtained through clustering, the negative sample includes a negative sample class cluster 213 and a negative sample class cluster 214 that are obtained through clustering, a distance between a clustering center of the positive sample class cluster 211 and the anchor image 210 is L1, a distance between a clustering center of the positive sample class cluster 212 and the anchor image 210 is L2, a distance between a clustering center of the negative sample class cluster 213 and the anchor image 210 is L3, and a distance between a clustering center of the negative sample class cluster 214 and the anchor image 210 is L4.

In this application, a plurality of positive samples are clustered to obtain a plurality of positive sample class clusters, a distance between the anchor image and a clustering center of a class cluster most similar to the anchor image is set to L2, a distance between the anchor image and another positive sample in the plurality of positive samples is set to L1 (it is to be noted that, L2 shown in FIG. 2 is merely the distance between the clustering center of the positive sample class cluster 212 and the anchor image, and a distance between another positive sample of the positive sample class cluster 212 and the anchor image is L1), and the anchor image and the plurality of positive samples are pulled close to each other according to redefined distances between the plurality of positive samples and the anchor image. In the related art, it is considered that distances between all positive samples and the anchor image are the same.

In this application, a plurality of negative samples are clustered to obtain a plurality of negative sample class clusters, a weight is assigned to each class cluster based on a similarity between a clustering center of each class cluster and the anchor image, and the anchor image and the negative samples are pulled away from each other according to the weight of the class cluster. L3 and LA shown in FIG. 2 are weighted distances. In the related art, it is considered that distances between all negative samples and the anchor image are the same.

Image encoder use phase: As shown in FIG. 2, the image encoder use phase in this application is a search process of a whole slide image.

First, one WSI is cropped into a plurality of tissue images (small images). Then, the plurality of tissue images are clustered to obtain a plurality of key images, where the plurality of key images are jointly configured for representing one WSI. Next, for one key image (a small image A), the small image A is inputted into the image encoder, to obtain an image feature vector of the small image A. Finally, a database is queried according to the image feature vector of the small image A to obtain small images A1 to AN, WSIs corresponding to the small images A1 to AN are used as search results, and the plurality of key images are used as queried images to determine the WSI from the database.

In some embodiments, the training device 21 of the image encoder and the use device 22 of the image encoder may be a computer device having a machine learning capability. For example, the computer device may be a terminal or a server.

In some embodiments, the training device 21 of the image encoder and the use device 22 of the image encoder may be the same computer device, or the training device 21 of the image encoder and the use device 22 of the image encoder may be different computer devices. In addition, when the training device 21 of the image encoder and the use device 22 of the image encoder are different devices, the training device 21 of the image encoder and the use device 22 of the image encoder may be devices of the same type. For example, both the training device 21 of the image encoder and the use device 22 of the image encoder may be servers. Alternatively, the training device 21 of the image encoder and the use device 22 of the image encoder may be devices of different types. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, an in-vehicle terminal, a smart television, a wearable device, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this application.

Detailed descriptions are provided below in the following order.

Image encoder training phase—1;
- related content of pulling an anchor image and a negative sample away from each other—1-1;
  - related content of a first weight loss function—1-1-1;
  - related content of a second weight loss function—1-1-2;
- related content of pulling the anchor image and a positive sample close to each other—1-2;
  - related content of a first group loss function—1-2-1;
  - related content of a second group loss function—1-2-2; and
- related content of a complete loss function—1-3; and image encoder use phase (search process of a whole slide image)—2.

Figure 3:
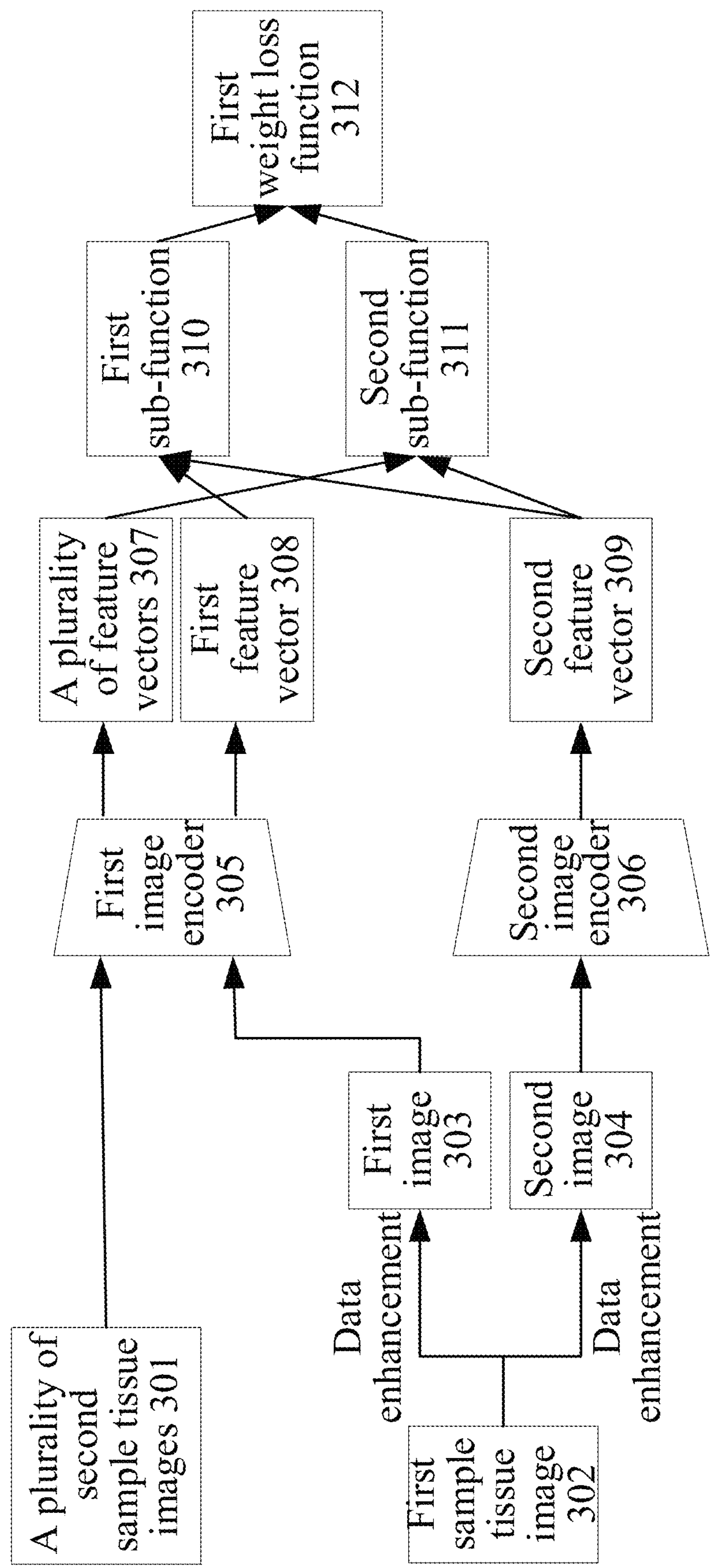
FIG. 3 is a schematic diagram of an image encoder training architecture according to an embodiment of this application.

Related Content of a First Weight Loss Function—1-1-1:

FIG. 3 shows an image encoder training framework according to an exemplary embodiment. Descriptions are provided by using an example in which the framework is applied to the training device 21 of the image encoder shown in FIG. 2.

In FIG. 3, feature vectors respectively corresponding to a plurality of second sample tissue images 301 are generated based on the plurality of second sample tissue images 301 through a first image encoder 305, that is, a plurality of feature vectors 307 are generated; data enhancement is performed on a first sample tissue image 302 to obtain a first image 303, and a first feature vector 308 is generated based on the first image 303 through the first image encoder 305; data enhancement is performed on the first sample tissue image 302 to obtain a second image 304, and a second feature vector 309 is generated based on the second image 304 through the second image encoder 306; a first sub-function 310 is generated based on the first feature vector 308 and the second feature vector 309; a second sub-function 311 is generated based on the plurality of feature vectors 307 and the second feature vector 309; and a first weight loss function 312 is generated based on the first sub-function 310 and the second sub-function 311.

The first weight loss function 312 is configured for pulling the anchor image and the negative sample away from each other.

Figure 4:
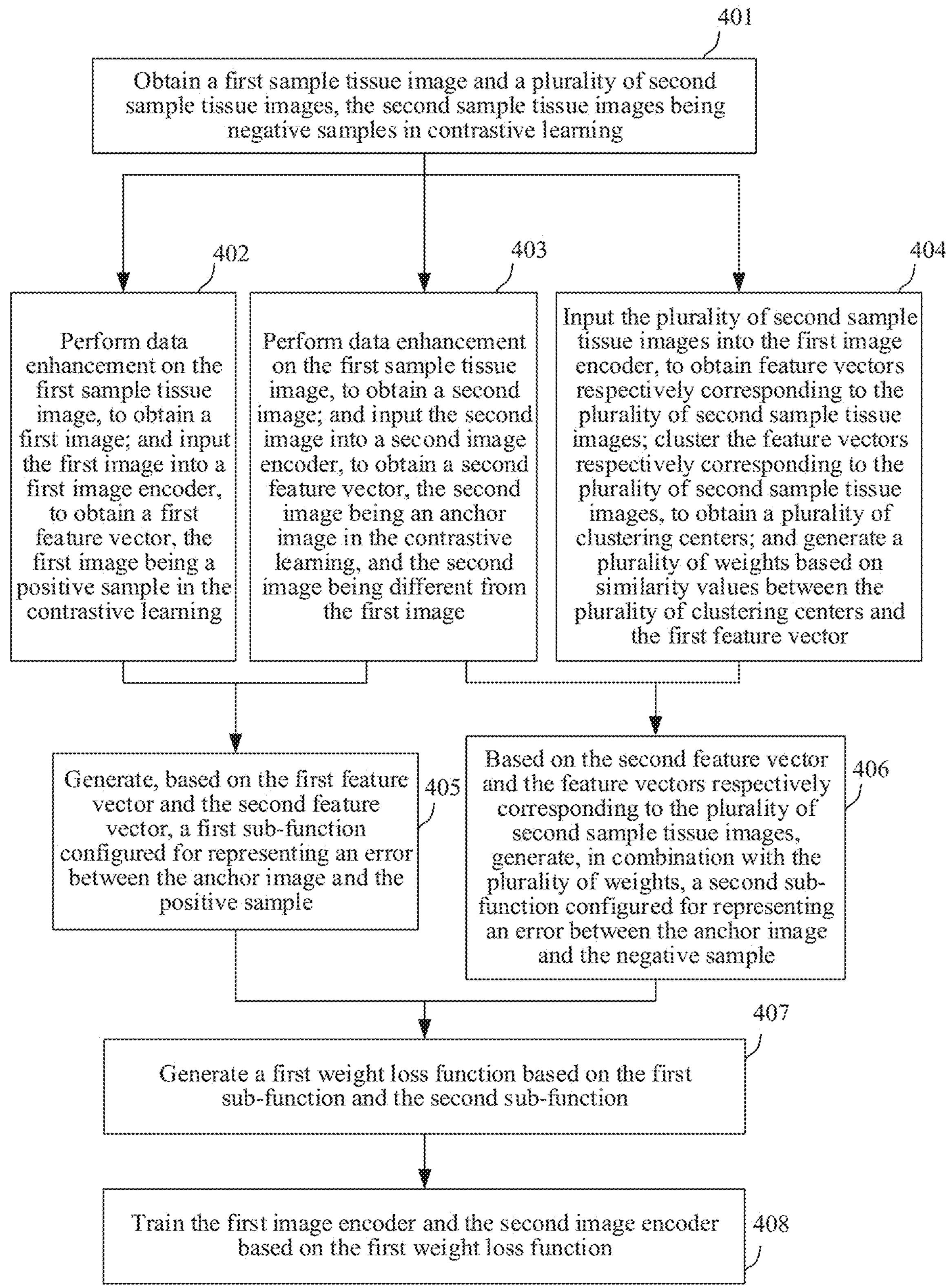
FIG. 4 is a flowchart of an image encoder training method according to an embodiment of this application.

FIG. 4 shows a flowchart of an image encoder training method according to an exemplary embodiment. Descriptions are provided by using an example in which the method is applied to the image encoder training framework shown in FIG. 3. The method is performed by a training device of an image encoder in the training framework. The method includes at least one of step 401 to step 408.

Step 401: Obtain a first sample tissue image and a plurality of second sample tissue images, the second sample tissue images being negative samples in contrastive learning.

The first sample tissue image is an image configured for training the image encoder in this application. The second sample tissue image is an image configured for training the image encoder in this application. The first sample tissue image and the second sample tissue image are different small images, that is, the first sample tissue image and the second sample tissue image are not a small image X1 and a small image X2 obtained by performing data enhancement on a small image X, but are respectively a small image X and a small image Y, where the small image X and the small image Y are small images in different large images, or the small image X and the small image Y are different small images in the same large image.

In some embodiments, the second sample tissue image is used as a negative sample in contrastive learning, and the contrastive learning aims to pull the anchor image and the positive sample close to each other and pull the anchor image and the negative sample away from each other.

Figure 5:
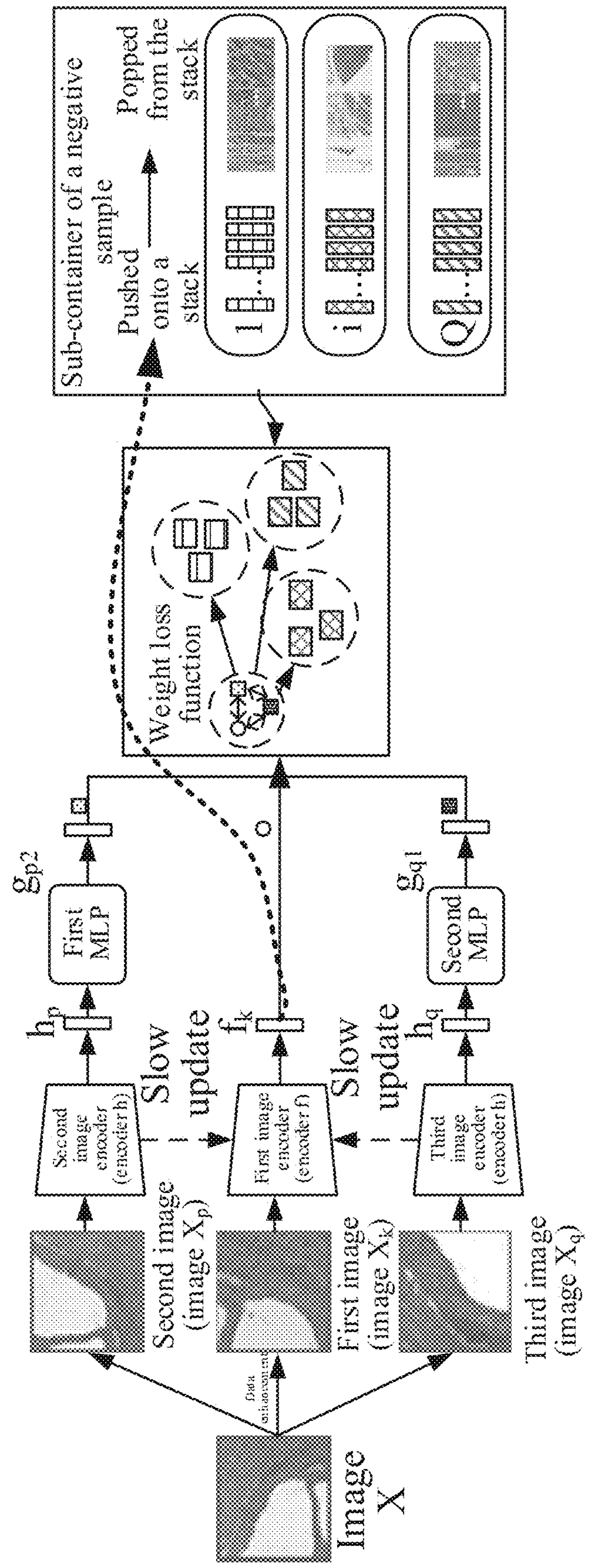
FIG. 5 is a schematic diagram of an image encoder training architecture according to an embodiment of this application.

With reference to FIG. 5, an image X is the first sample tissue image, and a sub-container of the negative sample is a container that contains the feature vectors respectively corresponding to the plurality of second sample tissue images.

Step 402: Perform data enhancement on the first sample tissue image, to obtain a first image; and input the first image into a first image encoder, to obtain a first feature vector, the first image being a positive sample in the contrastive learning.

Data enhancement is also referred to as data augmentation and aims to generate more data from limited data without substantially increasing data. In some embodiments, a data enhancement method includes but is not limited to at least one of the following:

- rotation/reflection transformation: randomly rotating an image by an angle, to change an orientation of content of the image;
- flipping transformation: flipping the image horizontally or vertically;
- zoom transformation: zooming in or out the image in a ratio;
- translation transformation: translating the image on a plane of the image in a manner;
- specifying a translation range and a translation step in a random or artificially defined manner, and performing translation horizontally or vertically to change a location of the image;
- scale transformation: zooming in or out the image according to a specified scale factor; or filtering, with reference to a SIFT feature extraction idea and using the specified scale factor, the image to construct a scale space, to change a size or a blur degree of the content of the image;
- contrast ratio transformation: in an HSV color space of the image, changing a saturation S and a V luminance component, keeping a hue H unchanged, performing an exponential operation on the S and the V component of each pixel (where an exponential factor is in a range of 0.25 and 4), and increasing illumination changes;
- noise disturbance: performing random disturbance on RGB of each pixel of the image, where a commonly used noise mode includes salt-and-pepper noise and Gaussian noise;
- color change: adding random disturbance to an image channel; and
- inputting the image and randomly selecting a region for blackening.

In some embodiments, data enhancement is performed on the first sample tissue image to obtain a first image, and the first image is used as a positive sample in the contrastive learning.

With reference to FIG. 5, data enhancement is performed on the image X to obtain an image $X_k$, and then the image $X_k$ is converted to a high-level semantic space $\mathbb{R}^d$ through an encoder f, so that a first feature vector $f_k$ is obtained.

Step 403: Perform data enhancement on the first sample tissue image, to obtain a second image; and input the second image into a second image encoder, to obtain a second feature vector, the second image being an anchor image in the contrastive learning, and the second image being different from the first image.

In some embodiments, data enhancement is performed on the first sample tissue image to obtain a second image, and the second image is used as an anchor image in the contrastive learning. In some embodiments, the first image and the second image are different images obtained in different data enhancement manners.

In some embodiments, the second image is inputted into the second image encoder, to obtain a first intermediate feature vector; and the first intermediate feature vector is inputted into a first MLP (multilayer perceptron), to obtain the second feature vector. The first MLP plays a transition role and is configured to improve an expression capability of the second image.

With reference to FIG. 5, data enhancement is performed on the image X to obtain an image $X_p$, the image $X_p$ is converted to the high-level semantic space $\mathbb{R}^d$ through an encoder h, that is, a first intermediate feature vector $h_p$ is obtained, and the first intermediate feature vector $h_p$ is inputted into the first MLP, to obtain a second feature vector $g_{p2}$.

Step 404: Input the plurality of second sample tissue images into the first image encoder, to obtain feature vectors respectively corresponding to the plurality of second sample tissue images; cluster the feature vectors respectively corresponding to the plurality of second sample tissue images, to obtain a plurality of clustering centers; and generate a plurality of weights based on similarity values between the plurality of clustering centers and the first feature vector.

In some embodiments, the second sample tissue image is a negative sample in the contrastive learning, the feature vectors respectively corresponding to the plurality of second sample tissue images are clustered, and weights are respectively assigned to a plurality of feature vectors according to similarity values between the plurality of clustering centers and the first feature vector.

With reference to FIG. 5, the sub-container of the negative sample contains the feature vectors respectively corresponding to the plurality of second sample tissue images, that is, the plurality of feature vectors. The plurality of second sample tissue images are inputted into the encoder f and then are stored in a storage queue by performing a stack pushing operation. In the storage queue, k-means clustering is performed on the storage queue to cluster a plurality of feature vectors in the queue into Q categories, to further construct Q sub-queues, where a clustering center of each sub-queue is represented as $c_j$(j=1, . . . , Q), Q being a positive integer. Then, a similarity score between each clustering center and the first feature vector $f_k$ is calculated, to determine potential and false negative samples. Finally, a weight $\phi(f_k^-)$ of each feature vector in the storage queue is obtained, which is calculated as follows:

$$\phi(f_k^-) = \begin{cases} w, \text{ if } \delta(f_k, c_j) \\ 1, \text{ else} \end{cases}; \quad (1)$$

δ( ) is a discriminant function. If two inputs are consist, δ( ) outputs 1, or otherwise, δ( ) outputs 0. In some embodiments, δ( ) is configured for determining whether a $j^{th}$ clustering center $c_j$ is similar to $f_k$, where w is an assigned weight, and $w \in [0,1]$. Certainly, this application does not limit a manner for calculating a similarity, including but not limited to calculating a cosine similarity, a Euclidean distance, and the like.

In some embodiments, values of the weights respectively corresponding to the plurality of clustering centers are in a negative correlation with the similarity values between the clustering centers and the first feature vector; and for the $j^{th}$ clustering center in the plurality of clustering centers, feature vectors included in a category of the $j^{th}$ clustering center correspond to the same weight. In formula (1), smaller weights w are assigned to a plurality of feature vectors corresponding to categories of clustering centers more similar to $f_k$, and greater weights w are assigned to a plurality of feature vectors corresponding to categories of clustering centers less similar to $f_k$.

For example, the plurality of feature vectors corresponding to the plurality of second sample tissue images are clustered into 3 categories, and clustering centers are namely $c_1$, $c_2$, and $c_3$. A category of the clustering center $c_1$ includes a feature vector 1, a feature vector 2, and a feature vector 3. A category of the clustering center $c_2$ includes a feature vector 4, a feature vector 5, and a feature vector 6. A category of the clustering center $c_3$ includes a feature vector 7, a feature vector 8, and a feature vector 9.

If similarity values between the clustering centers $c_1$, $c_2$, and $c_3$ and $f_k$ are sorted in descending order, weights corresponding to the categories of the clustering centers $c_1$, $c_2$, and $c_3$ are sorted in ascending order. In addition, the feature vectors 1, 2, and 3 correspond to the same weight, the feature vectors 4, 5, and 6 correspond to the same weight, and the feature vectors 7, 8, and 9 correspond to the same weight.

In some embodiments, when the first sample tissue image belongs to a first sample tissue image in a first training batch, the feature vectors respectively corresponding to the plurality of second sample tissue images are clustered, to obtain a plurality of clustering centers corresponding to the first training batch.

In some embodiments, when the first sample tissue image belongs to a first sample tissue image in an $n^{th}$ training batch, a plurality of clustering centers corresponding to an $(n-1)^{th}$ training batch are updated to a plurality of clustering centers corresponding to the $n^{th}$ training batch, n being a positive integer greater than 1.

In some embodiments, for a $j^{th}$ clustering center in the plurality of clustering centers in the $(n-1)^{th}$ training batch, the $j^{th}$ clustering center in the $(n-1)^{th}$ training batch is updated based on a first sample tissue image of a $j^{th}$ category in the $n^{th}$ training batch, to obtain a $j^{th}$ clustering center corresponding to the $n^{th}$ training batch, i and j being positive integers.

With reference to FIG. 5, a $j^{th}$ clustering center $c_{j*}$ in the $n^{th}$ training batch is updated according to a $j^{th}$ clustering center $c_j$ in the $(n-1)^{th}$ training batch, and a formula is expressed as follows:

$$c_{j*} = m_c c_j + (1 - m_c) \cdot \frac{1}{|\mathcal{B}_j|} \sum_{f_k^i \in \mathcal{B}_j} f_k^i; \tag{2}$$

$c_{j*}$ represents the updated $j^{th}$ clustering center in the $n^{th}$ training batch, $m_c$ represents a weight updated for use, $m_c \in [0,1]$. $\mathcal{B}_j$ represents a feature set of the $j^{th}$ category in a plurality of first feature vectors (a plurality of $f_k$) of a plurality of first sample tissue images (a plurality of images X) in the $n^{th}$ training batch. $f_k^i$ represents an $i^{th}$ feature vector in the plurality of first feature vectors (the plurality of $f_k$) of the $j^{th}$ category in the $n^{th}$ training batch. $1/|\mathcal{B}_j|(\sum_{f_k^i \in \mathcal{B}_j} f_k^i)$ is configured for calculating a mean value of features of the plurality of first feature vectors (the plurality of $f_k$) of the $j^{th}$ category in the $n^{th}$ training batch.

In some embodiments, during each training period, all clustering centers may be updated by re-clustering all negative sample feature vectors in a repository.

It may be understood that, an objective of updating the plurality of clustering centers in the $(n-1)^{th}$ training batch to the plurality of clustering centers in the $n^{th}$ training batch is to prevent negative sample feature vectors in a negative sample container from being farther away from the inputted first sample tissue image.

With continuous training on the image encoder, a better effect of the image encoder on pulling the anchor image and the negative sample away from each other is achieved. It is assumed that the image encoder pulls an image X in a previous training batch away from the negative sample to a first distance, and the image encoder pulls an image X in a current training batch away from the negative sample to a second distance, the second distance being greater than the first distance. The image encoder pulls an image X in a next training batch away from the negative sample to a third distance, the third distance being greater than the second distance. However, if a negative sample image (that is, the clustering center) is not updated, an increase between the third distance and the second distance may be less than an increase between the second distance and the first distance, and a training effect of the image encoder may gradually become worse. If the negative sample image is updated (that is, the clustering center is updated), a distance between the updated negative sample image and the image X is properly reduced, which balances a pulling-away effect gradually improved by the image encoder, so that the image encoder can maintain more long-time training. In this way, the image encoder obtained through final training has a better capability to extract image features, making the extracted image features more accurate. Moreover, the clustering center is determined according to a category of the sample tissue image, which is beneficial to ensuring a correspondence between clustering centers in the previous and next batches, and avoids a correspondence error, thereby improve accuracy of determining the clustering center. In addition, the feature vectors are clustered, and weights of all feature vectors of a category are set to the same, which is beneficial to classifying the feature vectors, and makes a training effect better by weighting the feature vectors.

Step 405: Generate, based on the first feature vector and the second feature vector, a first sub-function configured for representing an error between the anchor image and the positive sample.

In some embodiments, a first sub-function is generated according to the first feature vector and the second feature vector, and the first sub-function is configured for representing an error between the anchor image and the positive sample.

With reference to FIG. 5, the first sub-function may be represented as $\exp(g_{p2} \cdot f_k / \tau)$, and it can be seen that the first sub-function includes the first feature vector $f_k$ and the second feature vector $g_{p2}$.

Step 406: Based on the second feature vector and the plurality of feature vectors, generate, in combination with a plurality of weights, a second sub-function configured for representing an error between the anchor image and the negative sample.

In some embodiments, according to the second feature vector and the plurality of feature vectors corresponding to the plurality of second sample tissue images, a second sub-function is generated in combination with a plurality of weights, where the second sub-function is configured for representing an error between the anchor image and the negative sample.

With reference to FIG. 5, the second sub-function may be represented as $\Sigma_{i=1}^{K} \exp(\phi(f_k^-) \cdot g_{p2} \cdot f_k^-/\tau)$, where $\phi(f_k^-)$ represents a weight of an $i^{th}$ negative sample feature vector (that is, a feature vector of a second sample tissue image), $f_k$ represents the $i^{th}$ negative sample feature vector, the negative sample container includes K negative sample feature vectors in total, and $g_{p2}$ represents a feature vector (that is, a second feature vector) of the anchor image, K being a positive integer.

Step 407: Generate a first weight loss function based on the first sub-function and the second sub-function.

With reference to FIG. 5, the first weight loss function may be expressed as follows:

$$\mathcal{L}_{WeightedNCE1} = -\frac{1}{2}\log\frac{\exp(g_{p2}\cdot f_k/\tau)}{\exp(g_{p2}\cdot f_k/\tau)+\sum_{i=1}^{K}\exp(\phi(f_k^-)\cdot g_{p2}\cdot f_k^-/\tau)}; \tag{3}$$

$\mathcal{L}_{WeightedNCE1}$ represents the first weight loss function, and log represents a logarithm operation. In some embodiments, weighted summation is performed on the first sub-function and the second sub-function, to obtain the first weight loss function. In some embodiments, weight values respectively corresponding to the first sub-function and the second sub-function are not limited in this application. In some embodiments, the weight value is a preset hyperparameter.

Step 408: Train the first image encoder and the second image encoder based on the first weight loss function.

The first image encoder and the second image encoder are trained based on the first weight loss function. A manner for training the first image encoder and the second image encoder by using the first weight loss function is not limited in the embodiments of this application. In some embodiments, Parameters in the first image encoder and the second image encoder are updated by using the first weight loss function in a forward gradient update or reverse gradient update manner.

In some embodiments, after step 408, step 409 (not shown in the figure) is further included.

Step 409: Update the first image encoder based on the second image encoder.

The first image encoder is updated based on the second image encoder. In some embodiments, a parameter of the first image encoder is updated in a weighting manner according to a parameter of the second image encoder.

For example, a formula for updating the parameter of the first image encoder is expressed as follows:

$$\theta' = m\cdot\theta' + (1-m)\cdot\theta; \tag{4}$$

θ' on a left side of formula (4) represents the parameter of the first image encoder after the update, θ' on a right side of formula (4) represents the parameter of the first image encoder before the update, and θ represents the parameter of the second image encoder, m being a constant. In some embodiments, m is equal to 0.99.

Based on the above, weights are assigned to negative samples identified in the related art, and a "negative degree" of the negative samples is further distinguished between the negative samples, so that a loss value used in contrastive learning (also referred to as a contrastive learning paradigm) can more accurately pull anchor images and the negative samples away from each other, and the impact of potential false negative samples is reduced, thereby better training an image encoder. In this way, the image encoder obtained through training can better distinguish different features between the anchor images and the negative samples, thereby improving precision of an image feature extracted by the image encoder, and further improving accuracy of a result of a downstream search task.

Further, in addition to jointly training the first image encoder and the second image encoder, the second image encoder further updates the parameter of the first image encoder, which is beneficial to increasing a convergence speed of the loss function, and improving training efficiency of the image encoder. Moreover, in addition to using the second image encoder to train the first image encoder, parameters shared between the second image encoder and the third image encoder are also used to train the first image encoder, which training the first encoder from different dimensions while enriching training manners of the image encoder. In this way, image features extracted through the trained first image encoder can be more accurate.

FIG. 3 and FIG. 4 further show that the first image encoder is trained through a sample triple (anchor image, positive sample, negative sample). In another embodiment, the first image encoder may also be trained through a plurality of sample triples. The following describes training on the first image encoder through two sample triples (anchor image 1, positive sample, negative sample) and (anchor image 2, positive sample, negative sample). The anchor image 1 and the anchor image 2 are images obtained by separately performing data enhancement on the same small image. A quantity of sample triples specifically constructed is not limited in this application.

Figure 6:
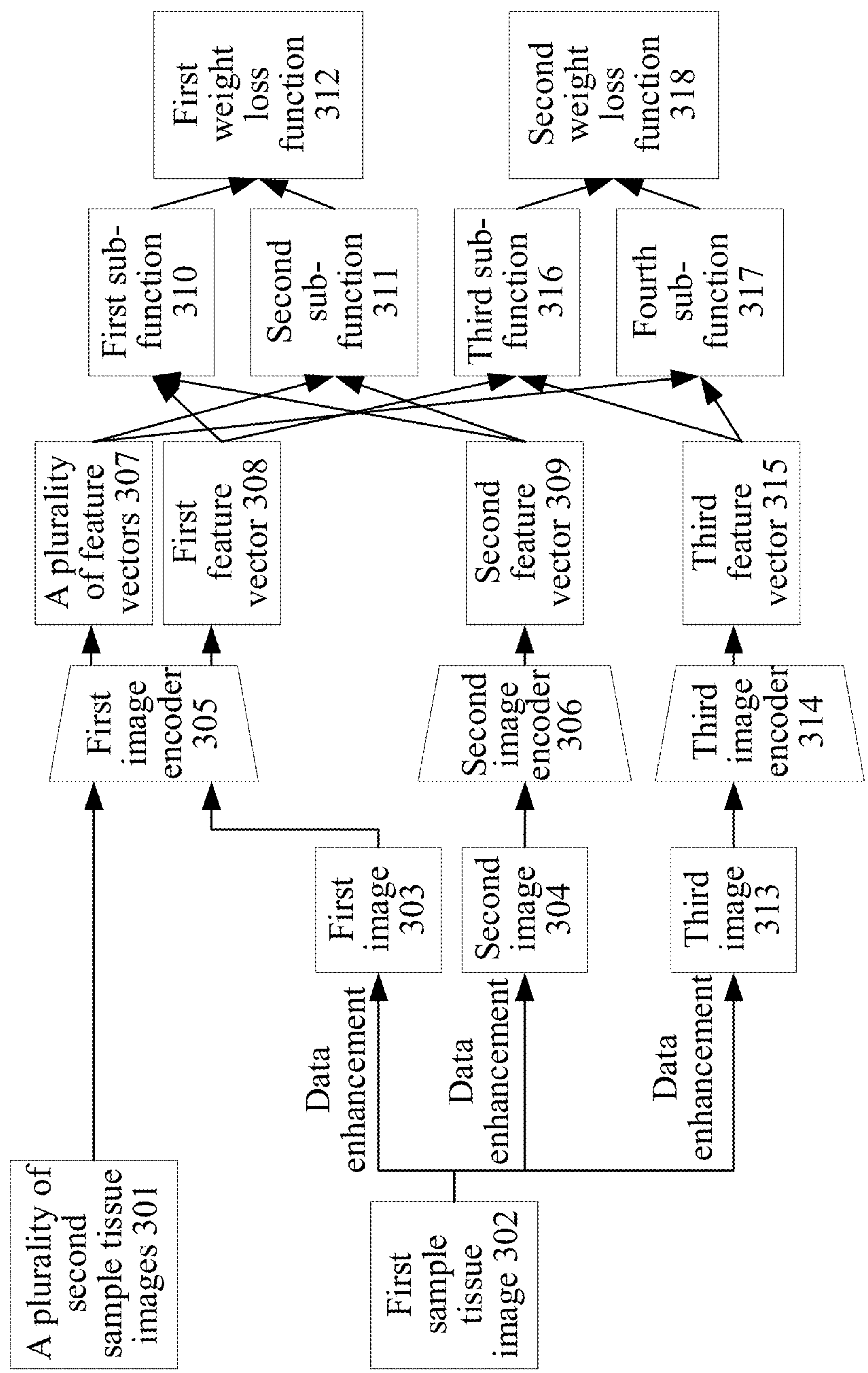
FIG. 6 is a schematic diagram of an image encoder training architecture according to an embodiment of this application.

Related Content of a Second Weight Loss Function—1-1-2:

FIG. 6 shows an image encoder training framework according to an exemplary embodiment. Descriptions are provided by using an example in which the framework is applied to the training device 21 of the image encoder shown in FIG. 1.

In FIG. 6, a plurality of feature vectors 307 are generated based on a plurality of second sample tissue images 301 through a first image encoder 305. data enhancement is performed on a first sample tissue image 302 to obtain a first image 303, and a first feature vector 308 is generated based on the first image 303 through the first image encoder 305; data enhancement is performed on the first sample tissue image 302 to obtain a second image 304, and a second feature vector 309 is generated based on the second image 304 through the second image encoder 306; a first sub-function 310 is generated based on the first feature vector 308 and the second feature vector 309; a second sub-function 311 is generated based on the plurality of feature vectors 307 and the second feature vector 309; and a first weight loss function 312 is generated based on the first sub-function 310 and the second sub-function 311.

Different from the training framework shown in FIG. 3, in FIG. 6, data enhancement is performed on the first sample tissue image 302 to obtain a third image 313, and a third feature vector 315 is obtained based on the third image 313 through the third image encoder 314; a third sub-function 316 is generated based on the third feature vector 315 and the first feature vector 308; a fourth sub-function 317 is generated based on the third feature vector 315 and the plurality of feature vectors 307; and a second weight loss function 318 is generated based on the third sub-function 316 and the fourth sub-function 317.

The second weight loss function 318 is configured for pulling the anchor image and the negative sample away from each other.

Figure 7:
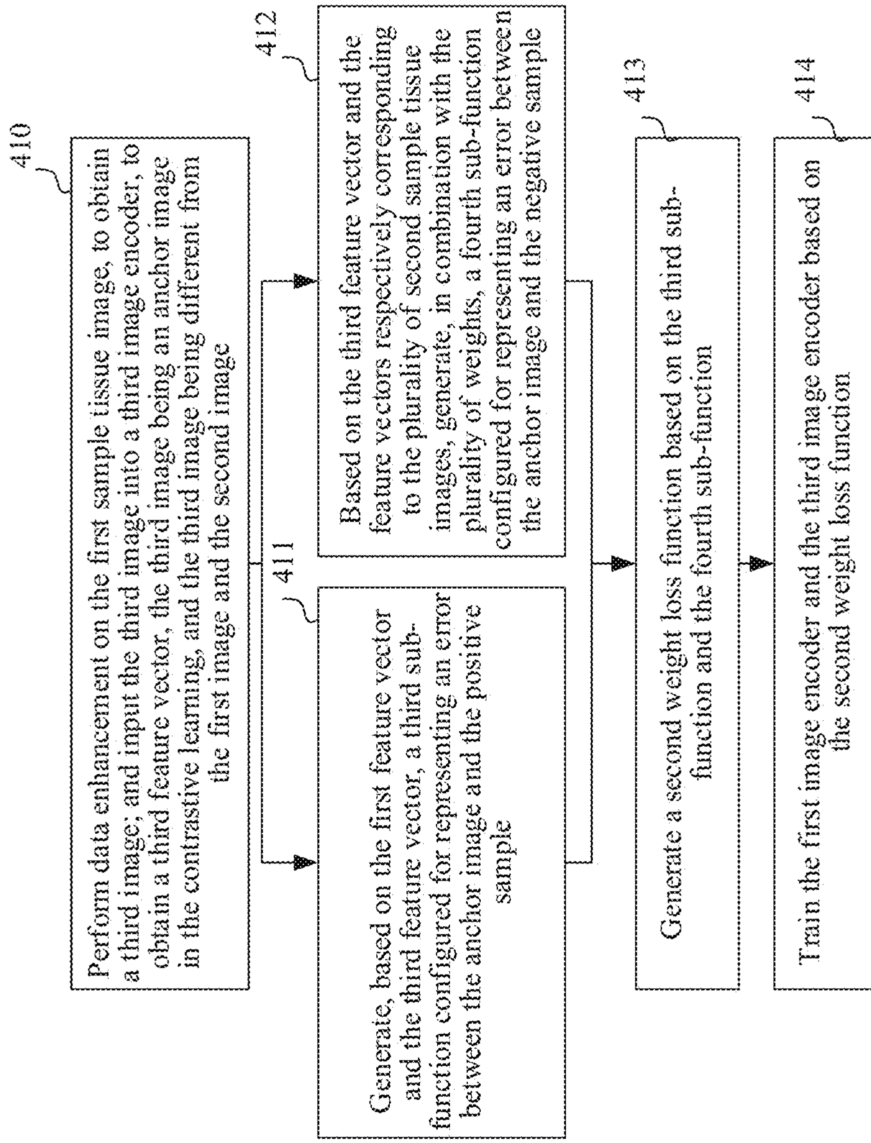
FIG. 7 is a flowchart of an image encoder training method according to another embodiment of this application.

Based on the image encoder training method shown in FIG. 4, FIG. 7 further provides step 410 to step 414 based on the method steps in FIG. 4, and descriptions are provided by using an example in which the method in FIG. 7 is applied to the image encoder training framework shown in FIG. 6. The method is performed by a training device of an image encoder in the training framework. The method includes the following steps:

Step 410: Perform data enhancement on the first sample tissue image, to obtain a third image; and input the third image into a third image encoder, to obtain a third feature vector, the third image being an anchor image in the contrastive learning.

In some embodiments, data enhancement is performed on the first sample tissue image to obtain a third image, and the third image is used as an anchor image in the contrastive learning. In some embodiments, the first image, the second image, and the third image are different images obtained in different data enhancement manners.

In some embodiments, the third image is inputted into the third image encoder, to obtain a second intermediate feature vector; and the second intermediate feature vector is inputted into a second MLP, to obtain the third feature vector. The second MLP plays a transition role and is configured to improve an expression capability of the third image.

With reference to FIG. 5, data enhancement is performed on the image X to obtain an image $X_q$, the image $X_q$ is converted to the high-level semantic space $\mathbb{R}^d$ through the encoder h, that is, a second intermediate feature vector $h_q$ is obtained, and the second intermediate feature vector $h_q$ is inputted into the second MLP, to obtain a third feature vector $g_{q1}$.

Step 411: Generate, based on the first feature vector and the third feature vector, a third sub-function configured for representing an error between the anchor image and the positive sample.

In some embodiments, a third sub-function is generated according to the first feature vector and the third feature vector, and the third sub-function is configured for representing an error between the anchor image and the positive sample.

With reference to FIG. 5, the third sub-function may be represented as $\exp(g_{q1} \cdot f_k/\tau)$, and it can be seen that the third sub-function includes the first feature vector $f_k$ and the third feature vector $g_{q1}$.

Step 412: Based on the third feature vector and the feature vectors respectively corresponding to the plurality of second sample tissue images, generate, in combination with the plurality of weights, a fourth sub-function configured for representing an error between the anchor image and the negative sample.

In some embodiments, according to the third feature vector and the plurality of feature vectors corresponding to the plurality of second sample tissue images, a fourth sub-function is generated in combination with the plurality of weights, where the fourth sub-function is configured for representing an error between the anchor image and the negative sample.

With reference to FIG. 5, the fourth sub-function may be represented as $\Sigma_{i=1}^{K} \exp(\phi(f_k^-) \cdot g_{g1} \cdot f_k^-/\tau)$, where $\phi(f_k)$ represents a weight of an $i^{th}$ negative sample feature vector (that is, a feature vector of a second sample tissue image), $f_k^-$ represents the $i^{th}$ negative sample feature vector, the negative sample container includes K negative sample feature vectors in total, and $g_{g1}$ represents a feature vector (that is, a third feature vector) of the anchor image.

Step 413: Generate a second weight loss function based on the third sub-function and the fourth sub-function.

With reference to FIG. 5, the second weight loss function may be expressed as follows:

$$\mathcal{L}_{WeightedNCE2} = -\frac{1}{2}\log\frac{\exp(g_{q1} \cdot f_k/\tau)}{\exp(g_{q1} \cdot f_k/\tau) + \sum_{i=1}^{K}\exp(\phi(f_k^-) \cdot g_{q1} \cdot f_k^-/\tau)}; \tag{5}$$

$\mathcal{L}_{WeightedNCE2}$ represents the second weight loss function, and log represents a logarithm operation.

Step 414: Train the first image encoder and the third image encoder based on the second weight loss function.

The first image encoder and the third image encoder are trained based on the second weight loss function.

In some embodiments, a complete weight loss function may be constructed with reference to the first weight loss function obtained in step 308, which is calculated as follows:

$$\mathcal{L}_{WeightedNCE} = -\frac{1}{2}\log\frac{\exp(g_{p2} \cdot f_k/\tau)}{\exp(g_{p2} \cdot f_k/\tau) + \sum_{i=1}^{K}\exp(\phi(f_k^-) \cdot g_{p2} \cdot f_k^-/\tau)} - \frac{1}{2}\log\frac{\exp(g_{q1} \cdot f_k/\tau)}{\exp(g_{q1} \cdot f_k/\tau) + \sum_{i=1}^{K}\exp(\phi(f_k^-) \cdot g_{q1} \cdot f_k^-/\tau)}; \tag{6}$$

$\mathcal{L}_{WeightedNCE}$ is the complete weight loss function. The first image encoder, the second image encoder, and the third image encoder are trained according to the complete weight loss function. A manner for training the first image encoder, the second image encoder, and the third image encoder by using the complete weight loss function is not limited in the embodiments of this application. In some embodiments, Parameters in the first image encoder, the second image encoder, and the third image encoder are updated by using the complete weight loss function in a forward gradient update or reverse gradient update manner.

In some embodiments, the step of updating the first image encoder based on the second image encoder in step 409 may be replaced with the updating, according to a parameter shared between the second image encoder and the third image encoder, a parameter of the first image encoder in a weighting manner, that is, θ in formula (4) in step 409 represents a parameter shared between the second image encoder and the third image encoder, and the first image encoder is slowly updated by using the parameter shared between the second image encoder and the third image encoder.

Based on the above, two sample triples (first image, second image, a plurality of second sample tissue images) and (third image, second image, a plurality of second sample tissue images) are constructed in the foregoing solution. The first image is an anchor image 1, and the third image is an anchor image 2. In this way, a coding effect of an image encoder obtained through training is further improved, and the complete weight loss function constructed is more robust than the first weight loss function or the second weight loss function.

The content of training the image encoder based on the weight loss function has been completely described above. The image encoder includes the first image encoder, the second image encoder, and the third image encoder. The following describes training on the image encoder based on a group loss function.

Figure 8:
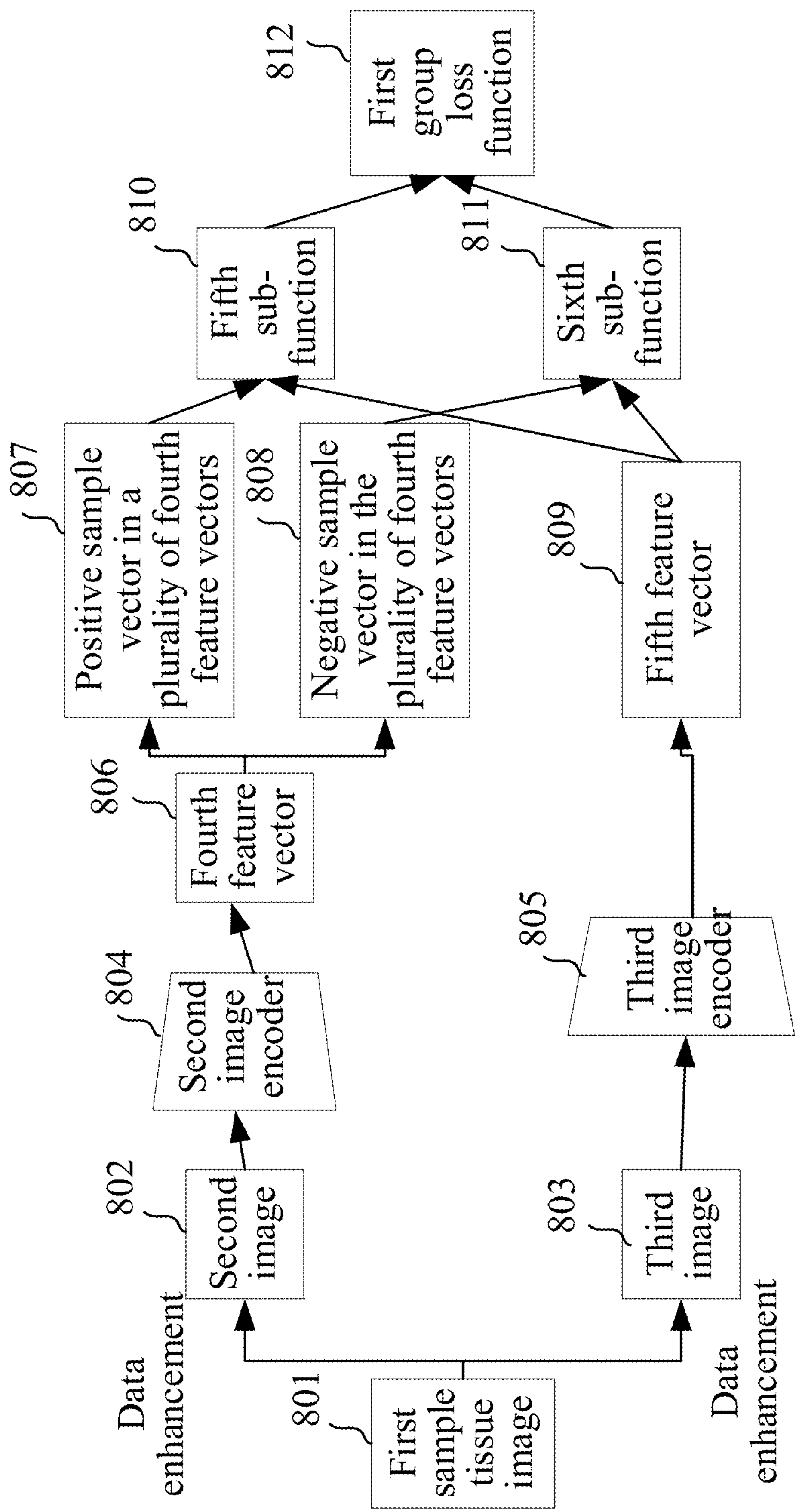
FIG. 8 is a schematic diagram of an image encoder training architecture according to an embodiment of this application.

Related Content of a First Group Loss Function—1-2-1:

FIG. 8 shows an image encoder training framework according to an exemplary embodiment. Descriptions are provided by using an example in which the framework is applied to the training device 21 of the image encoder shown in FIG. 1.

In FIG. 8, data enhancement is performed on a first sample tissue image 801 to obtain a second image 802, a fourth feature vector 806 is obtained based on the second image 802 through a second image encoder 804, and when a plurality of first sample tissue images 801 are simultaneously inputted, a positive sample vector 807 in a plurality of fourth feature vectors and a negative sample vector 808 in the plurality of fourth feature vectors are distinguished from the plurality of fourth feature vectors; data enhancement is performed on the first sample tissue image 801 to obtain a third image 803, and a fifth feature vector 809 is obtained based on the third image 803 through the third image encoder 805; a fifth sub-function 810 is generated based on the positive sample vector 807 in the plurality of fourth feature vectors and the fifth feature vector 809; a sixth sub-function 811 is generated based on the negative sample vector 808 in the plurality of fourth feature vectors and the fifth feature vector 809; and a first group loss function 812 is constructed based on the fifth sub-function 810 and the sixth sub-function 811.

The first group loss function 812 is configured for pulling the anchor image and the positive sample close to each other.

Figure 9:
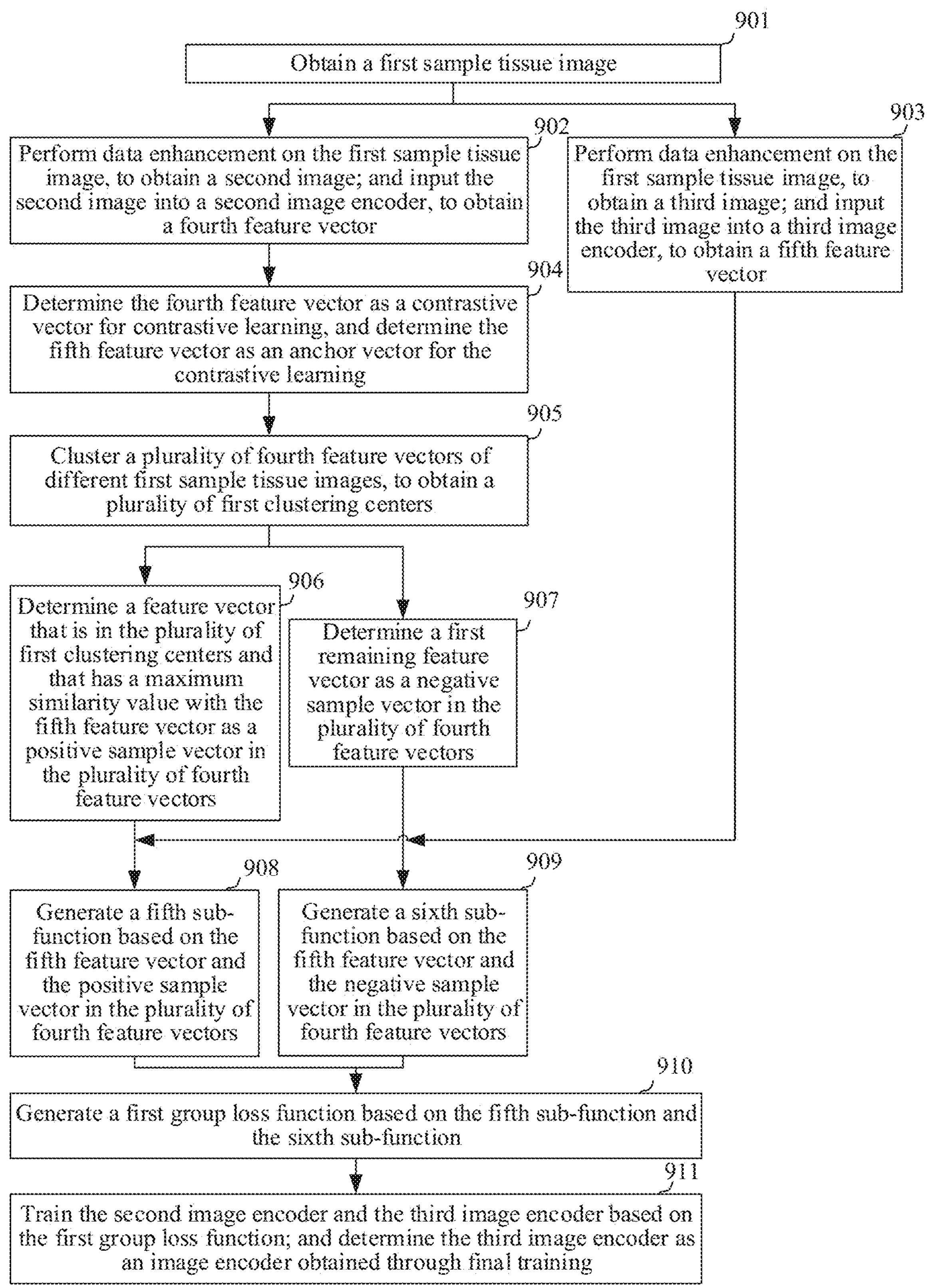
FIG. 9 is a flowchart of an image encoder training method according to another embodiment of this application.

FIG. 9 shows a flowchart of an image encoder training method according to an exemplary embodiment. Descriptions are provided by using an example in which the method is applied to the image encoder training framework shown in FIG. 8. The method includes the following steps:

Step 901: Obtain a first sample tissue image.

The first sample tissue image is an image configured for training the image encoder in this application, that is, a local region image (a small image) in the WSI.

Figure 10:
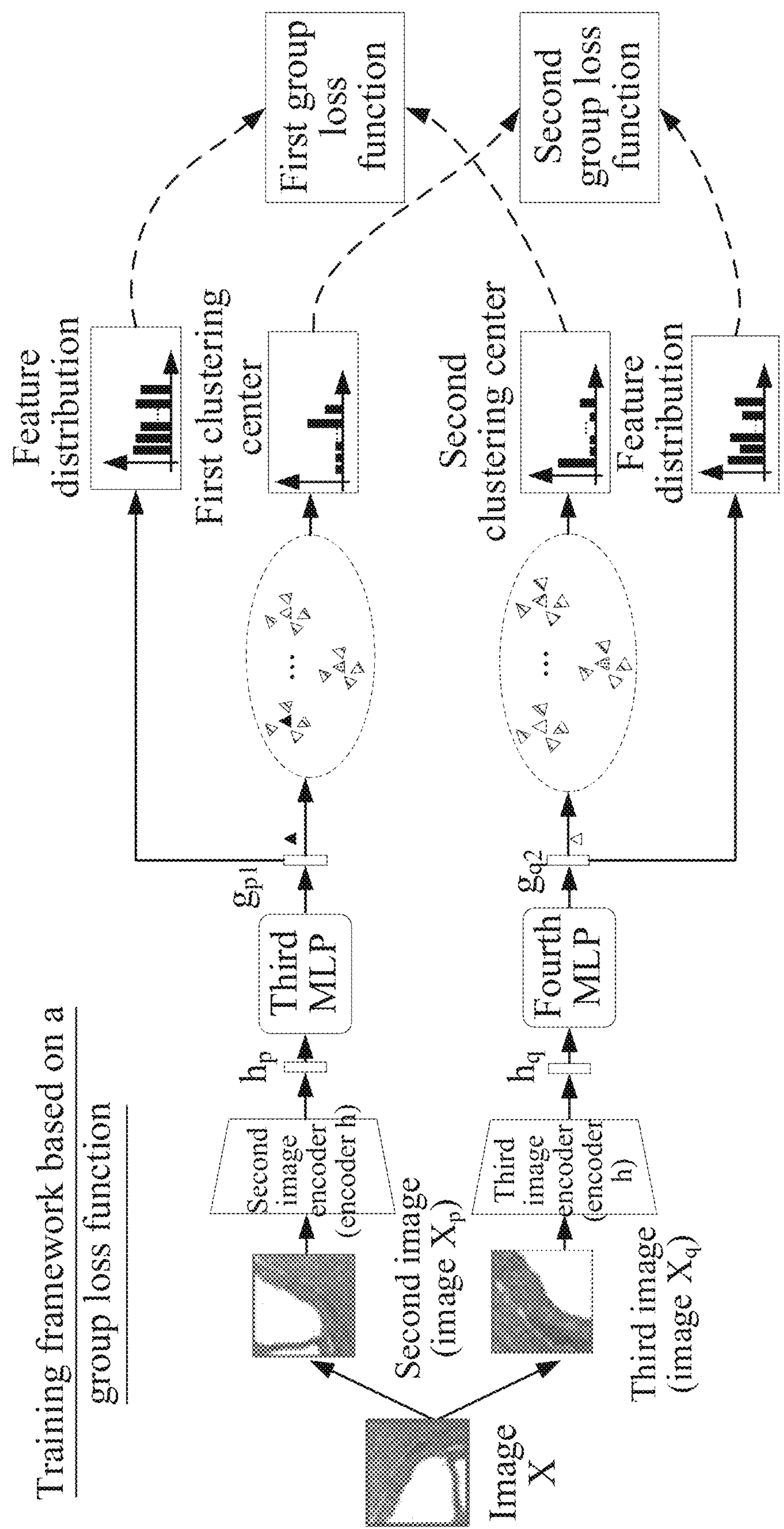
FIG. 10 is a schematic diagram of an image encoder training architecture according to an embodiment of this application.

With reference to FIG. 10, an image X is the first sample tissue image.

Step 902: Perform data enhancement on the first sample tissue image, to obtain a second image; and input the second image into a second image encoder, to obtain a fourth feature vector.

In some embodiments, data enhancement is performed on the first sample tissue image, to obtain a second image, and feature extraction is performed on the second image through the second image encoder, to obtain a fourth feature vector.

In some embodiments, the second image is inputted into the second image encoder, to obtain a first intermediate feature vector; and the first intermediate feature vector is inputted into a third MLP, to obtain the fourth feature vector. The third MLP plays a transition role and is configured to improve an expression capability of the second image.

With reference to FIG. 10, data enhancement is performed on the image X to obtain an image $X_p$, the image $X_p$ is converted to the high-level semantic space $\mathbb{R}^d$ through an encoder h, that is, a first intermediate feature vector $h_p$ is obtained, and the first intermediate feature vector $h_p$ is inputted into the third MLP, to obtain a second feature vector $g_{p1}$.

Step 903: Perform data enhancement on the first sample tissue image, to obtain a third image; and input the third image into a third image encoder, to obtain a fifth feature vector;

In some embodiments, data enhancement is performed on the first sample tissue image, to obtain a second image, and feature extraction is performed on the second image through the second image encoder, to obtain a fourth feature vector.

In some embodiments, the third image is inputted into the third image encoder, to obtain a second intermediate feature vector; and the second intermediate feature vector is inputted into a fourth MLP, to obtain the fifth feature vector. The fourth MLP plays a transition role and is configured to improve an expression capability of the third image.

With reference to FIG. 10, data enhancement is performed on the image X to obtain an image $X_q$, the image $X_q$ is converted to the high-level semantic space $\mathbb{R}^d$ through the encoder h, that is, a second intermediate feature vector $h_q$ is obtained, and the second intermediate feature vector $h_q$ is inputted into the fourth MLP, to obtain a fifth feature vector $g_{q2}$.

Step 904: Determine the fourth feature vector as a contrastive vector for contrastive learning, and determine the fifth feature vector as an anchor vector for the contrastive learning.

In some embodiments, the fourth feature vector is determined as a contrastive vector for contrastive learning, and the fifth feature vector is determined as an anchor vector for the contrastive learning. The contrastive vector in the contrastive learning may be a positive sample vector, or may be a negative sample vector.

Step 905: Cluster a plurality of fourth feature vectors of different first sample tissue images, to obtain a plurality of first clustering centers.

In some embodiments, a plurality of different first sample tissue images are simultaneously inputted, and a plurality of fourth feature vectors of the plurality of first sample tissue images are clustered, to obtain a plurality of first clustering centers. In some embodiments, the plurality of different first sample tissue images are sample tissue images in the same training batch.

In some embodiments, fourth feature vectors of different first sample tissue images are clustered into S categories, and S first clustering centers of the S categories are represented as $S_j^q$, where $j \in [1, \ldots, S]$, S being a positive integer.

FIG. 10 shows a first clustering center in a plurality of first clustering centers of fourth feature vectors of different first sample tissue images.

Step 906: Determine a feature vector that is in the plurality of first clustering centers and that has a maximum similarity value with the fifth feature vector as a positive sample vector in the plurality of fourth feature vectors.

In some embodiments, a first clustering center that is in the S first clustering centers and that is closest to the fifth feature vector is used as a positive sample vector, and is represented as $S_j^{q+}$.

Step 907: Determine a first remaining feature vector as a negative sample vector in the plurality of fourth feature vectors.

The first remaining feature vector is a feature vector other than the feature vector having the maximum similarity value with the fifth feature vector in the plurality of fourth feature vectors.

In some embodiments, a feature vector other than $S_j^q+$ in the S first clustering centers is used as a negative sample vector, and is represented as $S_j^q-$.

Step 908: Generate a fifth sub-function based on the fifth feature vector and the positive sample vector in the plurality of fourth feature vectors.

In some embodiments, the fifth sub-function is represented as $\exp(g_{g2} \cdot S_j^q+/\tau)$.

$g_{q2}$ is used as an anchor vector in the contrastive learning, and $S_j^q+$ is used as a positive sample vector in the contrastive learning.

Step 909: Generate a sixth sub-function based on the fifth feature vector and the negative sample vector in the plurality of fourth feature vectors.

In some embodiments, the sixth sub-function is represented as $\Sigma_{i=1}^{S-1} \exp(g_{q2} \cdot S_j^q-/\tau)$.

The fifth feature vector $g_{g2}$ is used as an anchor vector in the contrastive learning, and $S_j^q-$ is used as a negative sample vector in the contrastive learning.

Step 910: Generate a first group loss function based on the fifth sub-function and the sixth sub-function.

In some embodiments, the first group loss function is expressed as follows:

$$\mathcal{L}_{GroupNCE1} = -\frac{1}{2}\log\frac{\exp(g_{q2} \cdot S_j^q+/\tau)}{\exp(g_{q2} \cdot S_j^q+/\tau) + \sum_{i=1}^{S-1}\exp(g_{q2} \cdot S_j^q-/\tau)}; \quad (7)$$

$\mathcal{L}_{GroupNCE1}$ represents the first group loss function, and log represents a logarithm operation.

Step 911: Train the second image encoder and the third image encoder based on the first group loss function; and determine the third image encoder as an image encoder obtained through final training.

The second image encoder and the third image encoder may be trained according to the first group loss function.

In some embodiments, the third image encoder is determined as an image encoder obtained through final training.

Based on the above, positive samples identified in the related art are further distinguished, and a "positive degree" of the positive samples is further distinguished between the positive samples, so that a loss value used in contrastive learning (also referred to as a contrastive learning paradigm) can more accurately pull anchor images and the positive samples close to each other, thereby better training an image encoder. In this way, the image encoder obtained through training can better learn a common feature between the anchor image and the positive sample, so that the trained image encoder performs feature extraction on the image more accurately.

FIG. 8 and FIG. 9 further show that the image encoder is trained through a feature vector sample triple, where the sample triple in the contrastive learning is (anchor vector, positive vector, negative vector). In another embodiment, the first image encoder may also be trained through a plurality of feature vector sample triples. The following describes training on the image encoder through two feature vector sample triples (anchor vector 1, positive vector 1, negative vector 1) and (anchor vector 2, positive vector 2, negative vector 2). The anchor vector 1 and the anchor vector 2 are different vectors obtained by performing data enhancement on the first sample tissue image and processing through different image encoders and different MLPs. A quantity of feature vector sample triples specifically constructed is not limited in this application.

Figure 11:
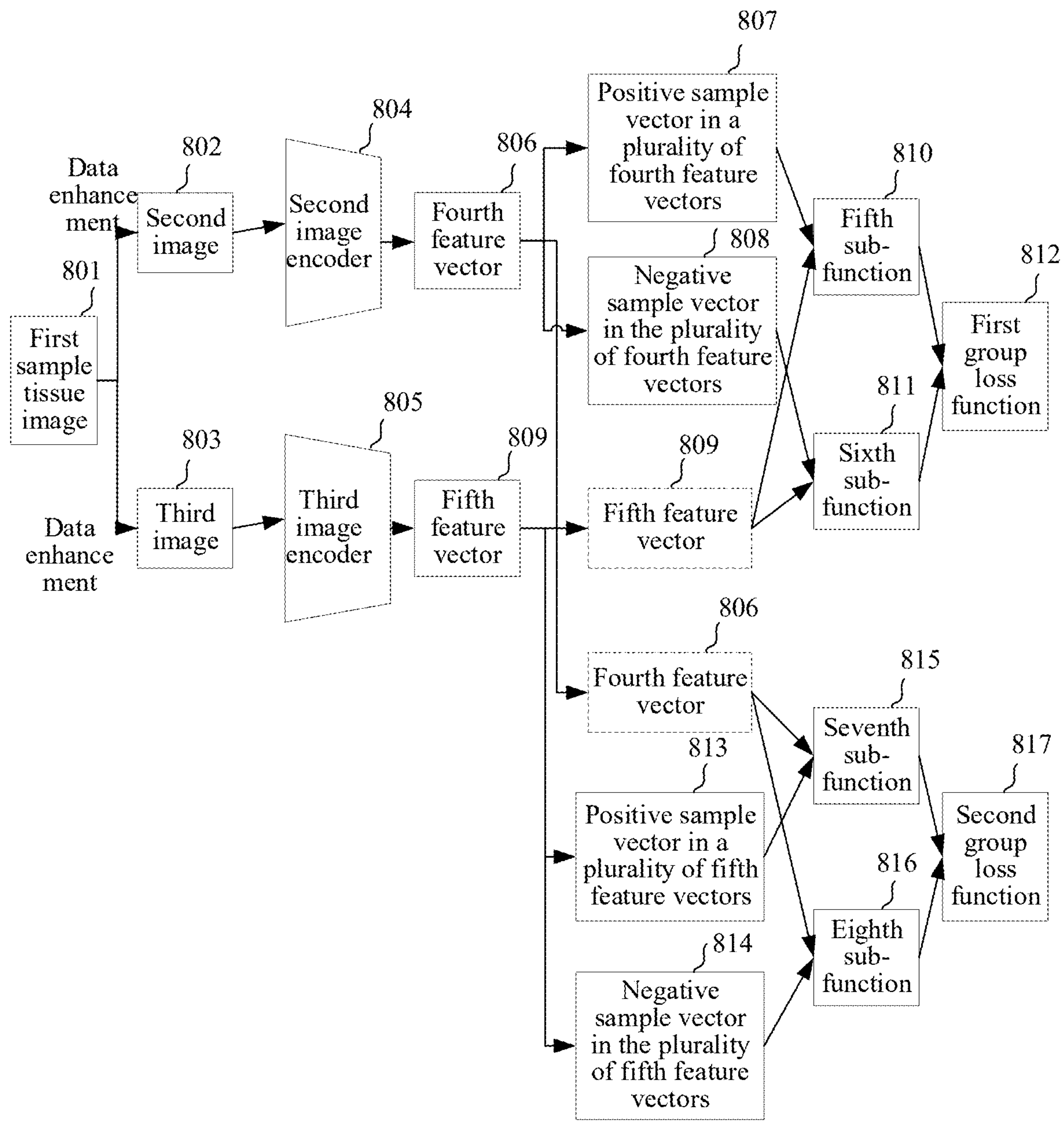
FIG. 11 is a schematic diagram of an image encoder training architecture according to an embodiment of this application.

Related Content of a Second Group Loss Function—1-2-2:

FIG. 11 shows an image encoder training framework according to an exemplary embodiment. Descriptions are provided by using an example in which the framework is applied to the training device 21 of the image encoder shown in FIG. 1.

In FIG. 11, data enhancement is performed on a first sample tissue image 801 to obtain a second image 802, a fourth feature vector 806 is obtained based on the second image 802 through a second image encoder 804, and when a plurality of first sample tissue images 801 are simultaneously inputted, a positive sample vector 807 in a plurality of fourth feature vectors and a negative sample vector 808 in the plurality of fourth feature vectors are distinguished from the plurality of fourth feature vectors; data enhancement is performed on the first sample tissue image 801 to obtain a third image 803, and a fifth feature vector 809 is obtained based on the third image 803 through the third image encoder 805; a fifth sub-function 810 is generated based on the positive sample vector 807 in the plurality of fourth feature vectors and the fifth feature vector 809; a sixth sub-function 811 is generated based on the negative sample vector 808 in the plurality of fourth feature vectors and the fifth feature vector 809; and a first group loss function 812 is constructed based on the fifth sub-function 810 and the sixth sub-function 811.

Different from the training framework shown in FIG. 8, in FIG. 11, when a plurality of first sample tissue images 801 are simultaneously inputted, a positive sample vector 813 in a plurality of fifth feature vectors and a negative sample vector 814 in the plurality of fifth feature vectors are distinguished from the plurality of fifth feature vectors; a seventh sub-function 815 is generated based on the positive sample vector 813 in the plurality of fifth feature vectors and the fourth feature vector 806; an eighth sub-function 816 is generated based on the negative sample vector 814 in the plurality of fifth feature vectors and the fourth feature vector 806; and a second group loss function 817 is constructed based on the seventh sub-function 815 and the eighth sub-function 816.

The second group loss function 817 is configured for pulling the anchor image and the positive sample close to each other.

Figure 12:
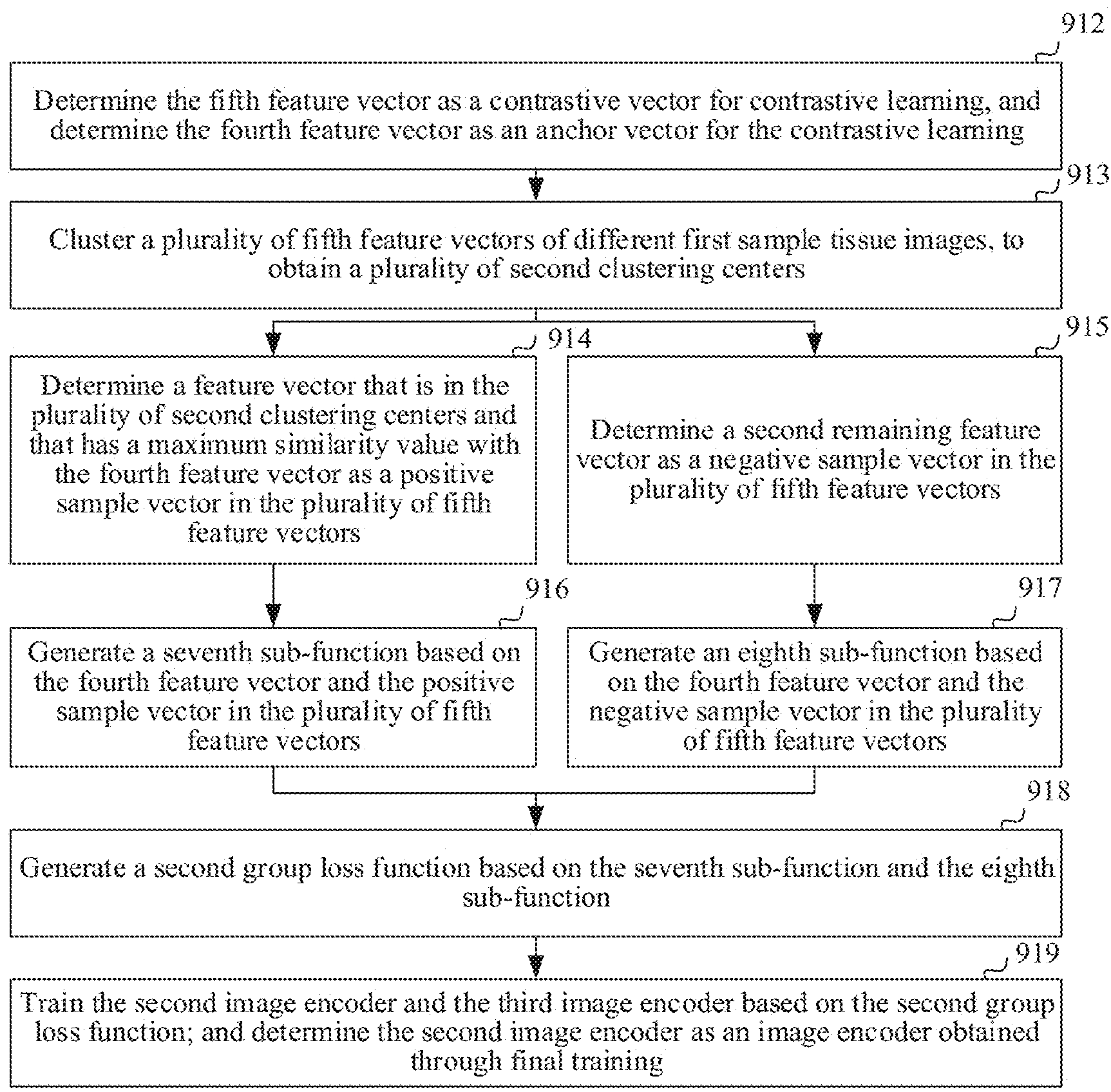
FIG. 12 is a flowchart of an image encoder training method according to another embodiment of this application.

Based on the image encoder training method shown in FIG. 9, FIG. 12 further provides step 912 to step 919 based on the method steps in FIG. 8, and descriptions are provided by using an example in which the method in FIG. 11 is applied to the image encoder training framework shown in FIG. 10. The method is performed by a training device of an image encoder in the training framework. The method includes the following steps:

Step 912: Determine the fifth feature vector as a contrastive vector for contrastive learning, and determine the fourth feature vector as an anchor vector for the contrastive learning.

In some embodiments, the fifth feature vector is determined as a contrastive vector for contrastive learning, and the fourth feature vector is determined as an anchor vector for the contrastive learning. The contrastive vector in the contrastive learning may be a positive sample vector, or may be a negative sample vector.

Step 913: Cluster a plurality of fifth feature vectors of different first sample tissue images, to obtain a plurality of second clustering centers.

In some embodiments, a plurality of different first sample tissue images are simultaneously inputted, feature vectors corresponding to the plurality of first sample tissue images, that is, a plurality of fifth feature vectors are clustered, to obtain a plurality of second clustering centers. In some embodiments, the plurality of different first sample tissue images are sample tissue images in the same training batch.

In some embodiments, fifth feature vectors of different first sample tissue images are clustered into S categories, and S second clustering centers of the S categories are represented as $S_j^p$, where $j \in [1, \ldots, S]$.

FIG. 10 shows a second clustering center in a plurality of second clustering centers of fifth feature vectors of different first sample tissue images.

Step 914: Determine a feature vector that is in the plurality of second clustering centers and that has a maximum similarity value with the fourth feature vector as a positive sample vector in the plurality of fifth feature vectors.

In some embodiments, a second clustering center that is in the S second clustering centers and that is closest to the fourth feature vector is used as a positive sample vector, and is represented as $S_j^p+$.

Step 915: Determine a second remaining feature vector as a negative sample vector in the plurality of fifth feature vectors.

The second remaining feature vector is a feature vector other than the feature vector having the maximum similarity value with the fourth feature vector in the plurality of fifth feature vectors.

In some embodiments, a feature vector other than $S_j^p+$ in the S second clustering centers is used as a negative sample vector, and is represented as $S_j^p-$.

Step 916: Generate a seventh sub-function based on the fourth feature vector and the positive sample vector in the plurality of fifth feature vectors.

In some embodiments, the seventh sub-function is represented as $\exp(g_{p1} \cdot S_j^p + /\tau)$.

Step 917: Generate an eighth sub-function based on the fourth feature vector and the negative sample vector in the plurality of fifth feature vectors.

In some embodiments, the eighth sub-function is represented as $\Sigma_{i=1}^{S-1} \exp(g_{p1} \cdot S_j^p - /\tau)$.

The fourth feature vector $g_{p1}$ is used as an anchor vector in the contrastive learning, and $S_j^p-$ is used as a negative sample vector in the contrastive learning.

Step 918: Generate a second group loss function based on the seventh sub-function and the eighth sub-function.

In some embodiments, the second group loss function is expressed as follows:

$$\mathcal{L}_{GroupNCE2} = -\frac{1}{2}\log\frac{\exp(g_{p1} \cdot S_j^p + /\tau)}{\exp(g_{p1} \cdot S_j^p + /\tau) + \sum_{i=1}^{S-1}\exp(g_{p1} \cdot S_j^p - /\tau)}; \tag{8}$$

$\mathcal{L}_{GroupNCE2}$ represents the second group loss function, and log represents a logarithm operation.

Step 919: Train the second image encoder and the third image encoder based on the second group loss function; and determine the second image encoder as an image encoder obtained through final training.

The second image encoder and the third image encoder are trained according to the second group loss function; and the second image encoder is determined as an image encoder obtained through final training.

In some embodiments, a complete group loss function may be constructed with reference to the first group loss function obtained in step 910, which is calculated as follows:

$$\mathcal{L}_{GroupNCE} = -\frac{1}{2}\log\frac{\exp(g_{p1} \cdot S_j^p + /\tau)}{\exp(g_{p1} \cdot S_j^p + /\tau) + \sum_{i=1}^{S-1}\exp(g_{p1} \cdot S_j^p - /\tau)} - \frac{1}{2}\log\frac{\exp(g_{q2} \cdot S_j^q + /\tau)}{\exp(g_{q2} \cdot S_j^q + /\tau) + \sum_{i=1}^{S-1}\exp(g_{q2} \cdot S_j^q - /\tau)}; \tag{9}$$

$\mathcal{L}_{GroupNCE}$ is the complete group loss function. The second image encoder and the third image encoder are trained according to the complete group loss function. The second image encoder and the third image encoder are determined as image encoders obtained through final training.

In some embodiments, after step 919, the method further includes step 920: Update, according to a parameter shared between the second image encoder and the third image encoder, a parameter of the first image encoder in a weighting manner.

For example, a formula for updating the parameter of the first image encoder is expressed as follows:

$$\theta' = m \cdot \theta' + (1 - m) \cdot \theta; \tag{10}$$

θ' on a left side of formula (10) represents the parameter of the first image encoder after the update, θ' on a right side of formula (10) represents the parameter of the first image encoder before the update, and θ represents the parameter shared between the second image encoder and the third image encoder, m being a constant. In some embodiments, m is equal to 0.99.

Based on the above, two feature vector sample triples (fifth feature vector, positive vector in a plurality of fourth feature vectors, negative vector in a plurality of fourth feature vectors) and (fourth feature vector, positive vector in a plurality of fifth feature vectors, negative vector in a plurality of fifth feature vectors) are constructed, so that a coding effect of an image encoder obtained through training is further improved, precision of an image feature obtained through the image encoder is improved, and the complete group loss function constructed is more robust than the first group loss function or the second group loss function.

Related Content of a Complete Loss Function—1-3:

Based on FIG. 3 to FIG. 7, the first image encoder may be trained by using the weight loss function; and based on FIG. 8 to FIG. 12, the first image encoder may be trained by using the group loss function.

Figure 13:
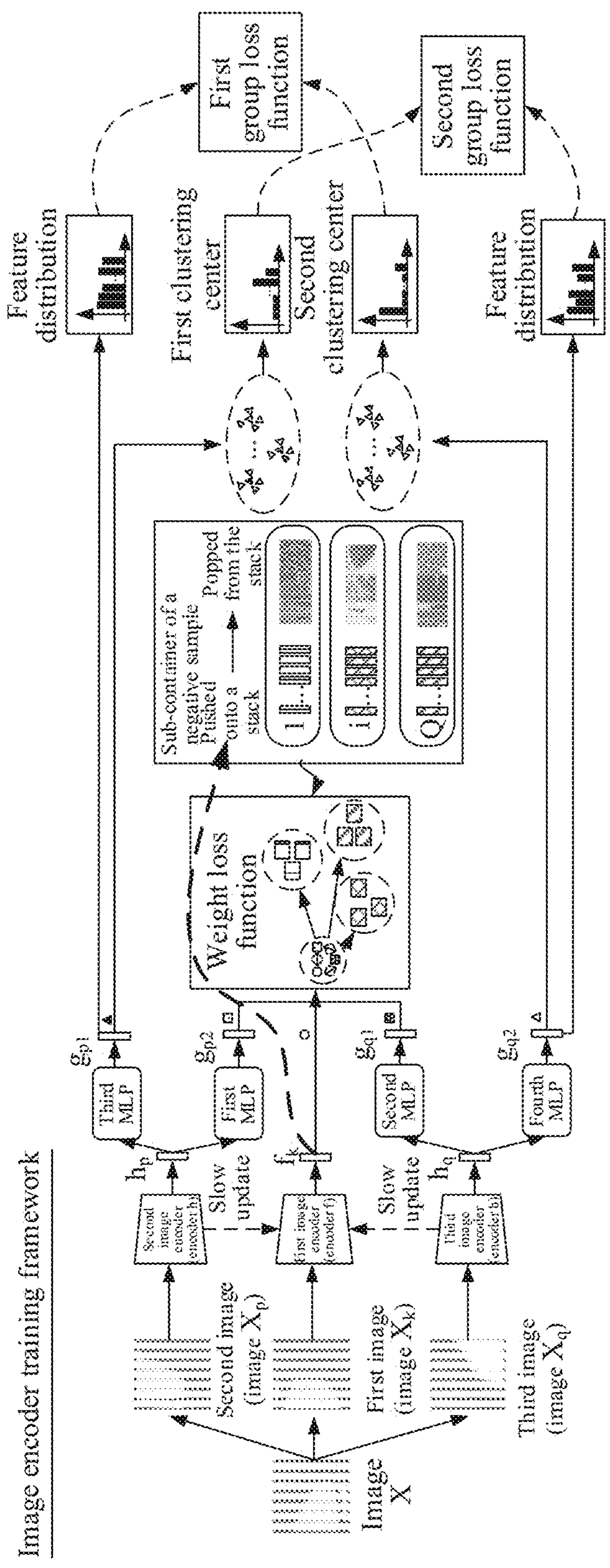
FIG. 13 is a schematic diagram of an image encoder training architecture according to an embodiment of this application.

In some embodiments, the first image encoder may be trained jointly by using the weight loss function and the group loss function. FIG. 13 shows a schematic diagram of a training architecture of a first image encoder according to an exemplary embodiment of this application.

Related Part of the Weight Loss Function:

Data enhancement is performed on the image X to obtain the image $X_k$, and the first feature vector $f_k$ is obtained based on the image $X_k$ through the encoder f; data enhancement is performed on the image X to obtain the image $X_p$, the first intermediate feature vector $h_p$ is obtained based on the image $X_p$ through the encoder h, and the second feature vector $g_{p2}$ is obtained based on the first intermediate feature vector $h_p$ through the first MLP; data enhancement is performed on the image X to obtain the image $X_q$, the second intermediate feature vector $h_q$ is obtained based on the image $X_q$ through the encoder h, and a third feature vector $g_{p1}$ is obtained based on the first intermediate feature vector $h_q$ through the second MLP; and the plurality of second sample tissue images are inputted into the encoder f and then are stored in a storage queue by performing a stack pushing operation, and in the storage queue, k-means clustering is performed on the storage queue to cluster negative sample feature vectors in the queue into Q categories, to further construct Q sub-queues. A weight is assigned to each clustering center based on a similarity value between each clustering center and $f_k$;

a sub-function configured for representing the negative sample and then anchor image is constructed based on Q clustering centers and the second feature vector $g_{p2}$; a sub-function configured for representing the positive sample and the anchor image is constructed based on the first feature vector $f_k$ and the second feature vector $g_{p2}$; the first weight loss function is formed in combination with two sub-functions;

a sub-function configured for representing the negative sample and then anchor image is constructed based on Q clustering centers and the third feature vector $g_{p1}$; a sub-function configured for representing the positive sample and the anchor image is constructed based on the first feature vector $f_k$ and the third feature vector $g_{p1}$; a second weight loss function is formed by combining the two sub-functions; and the first image encoder, the second image encoder, and the third image encoder are trained based on the weight loss function obtained by combining the first weight loss function and the second weight loss function, and the parameter of the first image encoder is slowly updated by using the parameter shared between the second image encoder and the third image encoder.

Related Part of the Group Loss Function:

Data enhancement is performed on the image X to obtain the image $X_p$, the first intermediate feature vector $h_p$ is obtained based on the image $X_p$ through the encoder h, and the fourth feature vector $g_{p1}$ is obtained based on the first intermediate feature vector $h_p$ through the third MLP. Data enhancement is performed on the image X to obtain the image $X_q$, the second intermediate feature vector $h_q$ is obtained based on the image $X_q$ through the encoder h, and a fifth feature vector $g_{q2}$ is obtained based on the first intermediate feature vector $h_q$ through the fourth MLP.

In the same training batch, a plurality of fourth feature vectors $g_{p1}$ of a plurality of first sample tissue images are clustered to obtain a plurality of first clustering centers; a first clustering center that is in the plurality of first clustering centers and that is closest to a fifth feature vector $g_{q2}$ of one first sample tissue image is determined as a positive sample vector; a remaining feature vector in the plurality of first clustering centers is determined as a negative sample vector; a sub-function configured for representing an error between the positive sample vector and the anchor vector is constructed based on the positive sample vector and the fifth feature vector $g_{q2}$; a sub-function configured for representing an error between the negative sample vector and the anchor vector is constructed based on the negative sample vector and the fifth feature vector $g_{q2}$; and a first group loss function is formed by combining the two sub-functions.

In the same training batch, a plurality of fifth feature vectors $g_{q2}$ of a plurality of first sample tissue images are clustered to obtain a plurality of second clustering centers; a second clustering center that is in the plurality of second clustering centers and that is closest to a fourth feature vector $g_{p1}$ of one first sample tissue image is determined as a positive sample vector; a remaining feature vector in the plurality of second clustering centers is determined as a negative sample vector; a sub-function configured for representing an error between the positive sample vector and the anchor vector is constructed based on the positive sample vector and the fourth feature vector $g_{p1}$; a sub-function configured for representing an error between the negative sample vector and the anchor vector is constructed based on the negative sample vector and the fourth feature vector $g_{p1}$; and a second group loss function is formed by combining the two sub-functions.

The second image encoder and the third image encoder are trained based on a group loss function obtained by combining the first group loss function and the second group loss function.

Related Part of Combining the Weight Loss Function and the Group Loss Function:

It may be understood that, the training the image encoder based on the weight loss function and based on the group loss function are both to determine a similarity value based on clustering, positive and negative sample assumption is re-assigned, the weight loss function is configured for correcting positive and negative sample assumption of the negative sample in the related art, and the group loss function is configured for correcting positive and negative sample assumption of the positive sample in the related art.

In the training architecture shown in FIG. 13, the weight loss function and the group loss function are combined through a hyperparameter, which is expressed as follows:

$$\mathcal{L} = \mathcal{L}_{WeightedNCE} + \lambda\mathcal{L}_{GroupNCE}; \tag{11}$$

$\mathcal{L}$ on a left side of formula (11) is a final loss function, $\mathcal{L}_{WeightedNCE}$ is the weight loss function, $\mathcal{L}_{GroupNCE}$ is the group loss function, and $\lambda$ is used as a hyperparameter to adjust contributions of the two loss functions.

Based on the above, a final loss function is constructed through both the weight loss function and the group loss function. Compared with a single weight loss function or a single group loss function, the final loss function may be more robust, an image encoder obtained through final training may have a better coding effect, and a feature of a small image extracted through the image encoder can better represent the small image.

Figure 14:
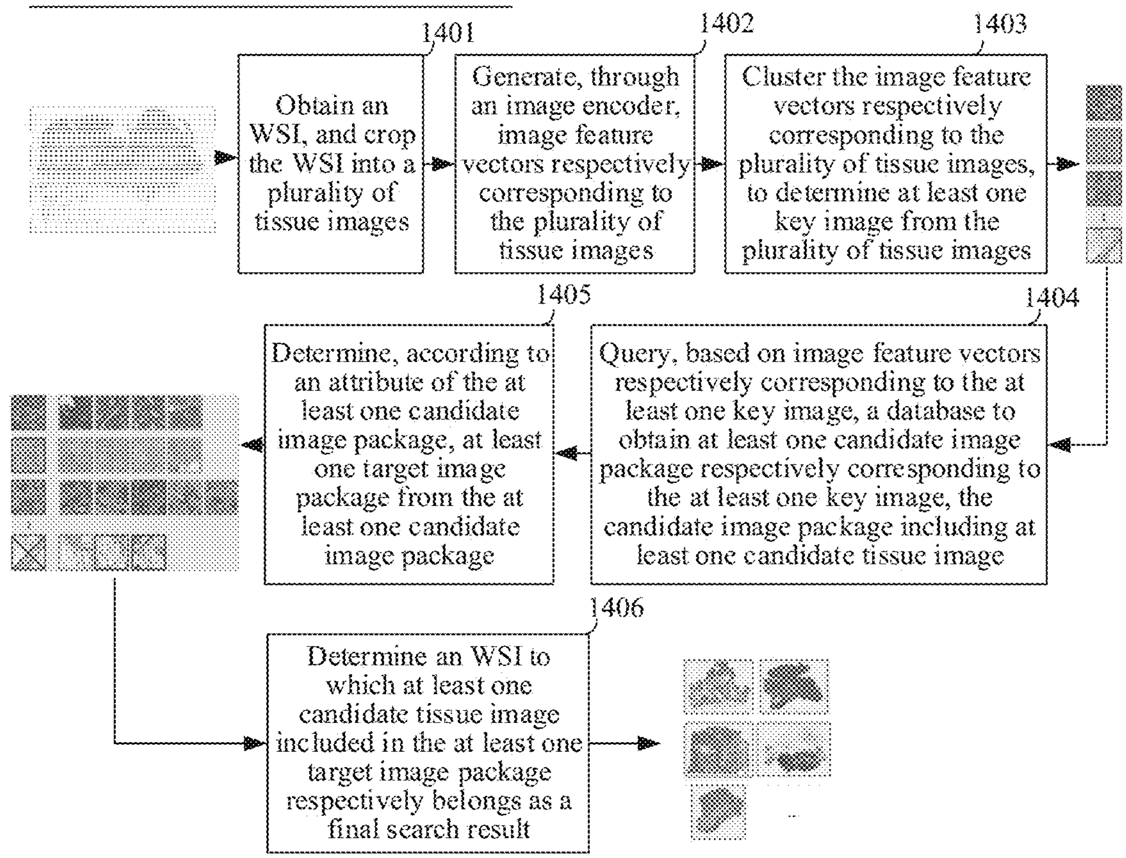
FIG. 14 is a flowchart of a method for searching for a whole slide image according to an embodiment of this application.

Image Encoder Use Phase—2:

The image encoder training phase is introduced above. The Image encoder use phase may be introduced below. In an embodiment of this application, the image encoder may be used in a WSI image search scenario. FIG. 14 shows a flowchart of a method for searching for a whole slide image according to an exemplary embodiment of this application. Descriptions are provided by using an example in which the method is applied to the use device 22 of the image encoder shown in FIG. 1. In this case, the use device 22 of the image encoder may also referred to as a device for searching for a whole slide image.

Step 1401: Obtain a whole slide image, and crop the whole slide image into a plurality of tissue images.

The whole slide image (WSI) is a visual digital image obtained by using a digital scanner to scan a conventional slide image to acquire a high-resolution image, and then using a computer to seamlessly splice acquired fragmented images. In this application, the WSI is usually referred to as a large image.

The tissue image is a local tissue region in the WSI, and the tissue image is usually referred to as a small image in this application.

In some embodiments, in a WSI preprocessing phase, a foreground tissue region in the WSI is extracted by using a threshold technology, and then the foreground tissue region in the WSI is cropped into a plurality of tissue images based on a sliding window technology.

Step 1402: Generate, through an image encoder, image feature vectors respectively corresponding to the plurality of tissue images.

In some embodiments, image feature vectors respectively corresponding to the plurality of tissue images are generated through the first image encoder obtained through training in the method embodiment shown in FIG. 4. In this case, the first image encoder is obtained through training based on the first weight loss function; or image feature vectors respectively corresponding to the plurality of tissue images are generated through the first image encoder obtained through training in the method embodiment shown in FIG. 7. In this case, the first image encoder is obtained through training based on the first weight loss function and the second weight loss function or image feature vectors respectively corresponding to the plurality of tissue images are generated through the third image encoder obtained through training in the method embodiment shown in FIG. 9. In this case, the third image encoder is obtained through training based on the first group loss function; or image feature vectors respectively corresponding to the plurality of tissue images are generated through the second image encoder or the third image encoder obtained through training in the method embodiment shown in FIG. 12. In this case, both the second image encoder and the third image encoder are obtained through training based on the first group loss function and the second group loss function; or image feature vectors respectively corresponding to the plurality of tissue images are generated through the first image encoder obtained through training in the embodiment shown in FIG. 13. In this case, the first image encoder is obtained through training based on the weight loss function and the group loss function.

Step 1403: Cluster the image feature vectors respectively corresponding to the plurality of tissue images, to determine at least one key image from the plurality of tissue images.

In some embodiments, the image feature vectors respectively corresponding to the plurality of tissue images are clustered, to obtain a plurality of first class clusters; and clustering centers respectively corresponding to the plurality of first class clusters are determined as image feature vectors respectively corresponding to the plurality of key images, that is, the plurality of key images are determined from the plurality of tissue images.

In another embodiment, the plurality of image feature vectors corresponding to the plurality of tissue images are clustered, to obtain a plurality of first class clusters, and then clustering is performed again. For a target first class cluster in the plurality of first class clusters, clustering is performed based on location features of whole slide images to which a plurality of tissue images corresponding to the target first class cluster respectively belong, to obtain a plurality of second class clusters; and That clustering centers respectively corresponding to the plurality of first class clusters are determined as image feature vectors respectively corresponding to the plurality of key images includes: for the target first class cluster in the plurality of first class clusters, determining clustering centers respectively corresponding to the plurality of second class clusters included in the target first class cluster as the image feature vectors of the key images, where the target first class cluster is any one of the plurality of first class clusters.

For example, clustering is performed in a K-means clustering manner. During the first clustering, a plurality of image feature vectors $f_{all}$ are clustered to obtain $K_1$ different categories, $K_1$ being a positive integer and represented as $F_i$, $i=1, 2, \ldots, K_1$. During the second clustering, in each class cluster $F_i$, spatial coordinate information of the plurality of tissue images is used as a feature, clustering is further performed to obtain $K_2$ categories, $K_2$ is a positive integer, and $K_2=\text{round}(R\cdot N)$. R is a proportional parameter. In some embodiments, R is equal to 20%; and N is a quantity of small images in the class cluster $F_i$. Based on double clustering, $K_1*K_2$ clustering centers may be finally obtained, tissue images corresponding to the $K_1*K_2$ clustering centers are used as $K_1*K_2$ key images, and the $K_1*K_2$ key images are used as a global representation of the WSI. In some embodiments, the key image is usually referred to as a mosaic image.

Step 1404: Query, based on image feature vectors respectively corresponding to the at least one key image, a database to obtain at least one candidate image package respectively corresponding to the at least one key image, the candidate image package including at least one candidate tissue image.

Based on step 1404, it may be obtained that $WSI=\{P_1, P_2, \ldots, P_i, \ldots, P_k\}$, where $P_i$ and k respectively represent a feature vector of an $i^{th}$ key image and a total quantity of key images in the WSI, both i and k being positive integers. When searching for the WSI, the key image are used as query images one by one to generate candidate image packages, and a total of k candidate image packages are generated, which is expressed as $Bag=\{\mathbb{B}_1, \mathbb{B}_2, \ldots, \mathbb{B}_i, \ldots, \mathbb{B}_k\}$, where an $i^{th}$ candidate image package $\mathbb{B}_i=\{b_{i1}, b_{i2}, \ldots, b_{ij}, \ldots, b_{it}\}$, and $b_{ij}$ and t respectively represent a $j^{th}$ candidate tissue image and a total quantity of candidate tissue images in $\mathbb{B}_i$, j being a positive integer.

Step 1405: Determine, according to an attribute of the at least one candidate image package, at least one target image package from the at least one candidate image package.

As can be seen from step 1405, a total of k candidate image packages are generated. To increase a WSI search speed and optimize final search results, k candidate image packages further need to be screened. In some embodiments, k candidate image packages are screened according to similarities between the candidate image packages and the WSI and/or diagnostic categories of the candidate image packages, to obtain a plurality of target image packages. Specific screening steps are described in detail below.

Step 1406: Determine a whole slide image to which at least one candidate tissue image included in the at least one target image package respectively belongs as a final search result.

After the plurality of target image packages are screened, whole slide images to which a plurality of target tissue images in the target image packages belong are determined as final search results. In some embodiments, the plurality of target tissue images in the target image packages may be from the same whole slide image, or may come from a plurality of different whole slide images.

Based on the above, first, the WSI is cropped into a plurality of small images, and the plurality of small images are inputted into the image encoder to obtain image feature vectors respectively corresponding to the plurality of small images, that is, a plurality of image feature vectors are obtained. The plurality of image feature vectors are clustered, and small images corresponding to clustering centers are used as key images. Next, the key images are queried to obtain candidate image packages. Then, the candidate image packages are screened to obtain the target image package. Finally, a WSI corresponding to at least one small image in the candidate image package is used as the final search result. This method provides a manner for searching for a WSI (a large image) with a WSI (a large image), and the clustering step and the screening step mentioned can greatly reduce an amount of data processed and improve search efficiency. In addition, the manner for searching for the WSI (the large image) with the WSI (the large image) provided in this embodiment does not require a training process, and can achieve fast search and matching. Specifically, the key images are determined from the plurality of small images in a clustering manner, and clustering centers are further determined as image features of the key images, which is beneficial to improving accuracy of the determined key images and image features corresponding to the key images.

In addition, the determining the target image package from the candidate image packages includes at least two manners, one is based on a quantity of diagnostic categories of the candidate image packages, and the other is based on similarities between the image features in the candidate image packages and the image features of the key images. Therefore, this embodiment of this application enriches a manner for determining search results, and further improves accuracy of the search results.

On the one hand, when the target image package is determined based on the quantity of diagnostic categories of the candidate image packages, the candidate image packages are screened based on the diagnostic categories, which is closer to the actual situation. Furthermore, entropy values corresponding to the candidate image packages are determined from a plurality of dimensions according to the diagnostic categories, so that the target image package is screened more intuitively.

On the other hand, when determining is performed based on the similarities between the image features in the candidate image packages and the image features of the key image, cosine similarities between the candidate tissue images in the candidate image packages and the key images are respectively calculated, and first m cosine similarity values are taken to determine a mean value, to further screen the target image package according to the mean value. In this case, not only a cosine similarity of a single feature is considered, m similarities are comprehensively considered. Therefore, this solution has better fault tolerance.

In the related art, a manner for using a small image to represent a large image often adopts manual selection. Pathologists use a color and a texture feature of each small image in the WSI (for example, histogram statistical information from various color spaces) to select a core small image. Then, features of the core small images are accumulated into a global representation of the WSI, and then a support vector machine (SVM) is used to classify the WSI global representations of a plurality of WSIs into two main disease types. In a search phase, once a disease type for which the WSI is to be searched is determined, image search may be performed on a WSI library with the same disease type.

Based on the embodiment shown in FIG. 14, step 1405 may be replaced with 1405-1.

1405-1: Screen the at least one candidate image package according to a quantity of diagnostic categories respectively included in the at least one candidate image package, to obtain the at least one target image package.

In some embodiments, for a first candidate image package that is in the at least one candidate image package and that corresponds to a first key image in the at least one key image, an entropy value of the candidate image package is calculated based on a cosine similarity between at least one candidate tissue image in the first candidate image package and the first key image, an occurrence probability of at least one diagnostic category in the database, and a diagnostic category of the at least one candidate tissue image, where the entropy value is configured for measuring a quantity of diagnostic categories corresponding to the first candidate image package, and the first candidate image package is any one of the at least one candidate image package; and the at least one candidate image package is screened, to obtain the at least one target image package whose entropy value is less than an entropy value threshold.

For example, a formula for calculating the entropy value is as follows:

$$Ent_i = -\sum_{m=1}^{u_i} p_m \cdot \log(p_m); \tag{12}$$

$Ent_i$ represents an entropy value of the $i^{th}$ candidate image package, $u_i$ represents a total quantity of diagnostic categories in the $i^{th}$ candidate image package, and $p_m$ represents an occurrence probability of an $m^{th}$ diagnosis type in the $i^{th}$ candidate image package, m being a positive integer.

It may be understood that, the entropy value is configured for representing a degree of uncertainty of the $i^{th}$ candidate image package. A greater entropy value indicates a higher degree of uncertainty of the $i^{th}$ candidate image package and more disordered distribution of the candidate tissue images in the $i^{th}$ candidate image package on a dimension of the diagnostic categories. In other words, the higher the degree of uncertainty of the $i^{th}$ key image, the less the $i^{th}$ key image can be used to represent the WSI. If a plurality of candidate tissue images in the $i^{th}$ candidate image package have the same diagnosis result, the entropy value of the candidate image package may be equal to 0, and the $i^{th}$ key image has the best representation of the WSI.

In formula (12), $p_m$ is calculated as follows:

$$p_m = \frac{\sum_{j=1}^{t} \delta(y_j, m) \cdot w_{y_j} \cdot (d_j + 1)/2}{\sum_{j=1}^{t} w_{y_j} \cdot (d_j + 1)/2}; \tag{13}$$

$y_j$ represents a diagnostic category of a $j^{th}$ candidate tissue image in the $i^{th}$ candidate image package; δ( ) is a discriminant function configured for determining whether the diagnostic category of the $j^{th}$ candidate tissue image is consistent with the $m^{th}$ diagnostic category. If the two are consistent, 1 is outputted, or otherwise, 0 is outputted; $w_{yj}$ is a weight of the $j^{th}$ candidate tissue image, and $w_{yj}$ is calculated based on the occurrence probability of at least one diagnostic category in the database; and di represents a cosine similarity between the $j^{th}$ candidate tissue image in the $i^{th}$ candidate package and the $i^{th}$ key image, and $(d_j+1)/2$ is used to ensure that the value is in a range of 0 and 1.

For ease of understanding, in formula (13), $w_{yj} \cdot (d_j+1)/2$ may be regarded as a weight score $v_j$, and is configured for representing the $j^{th}$ candidate tissue image in the $i^{th}$ candidate image package. A denominator of formula (13) represents a total score of the $i^{th}$ candidate image package, and a numerator of formula (13) represents a sum of scores of the $m^{th}$ diagnostic category of the $i^{th}$ candidate image package.

Based on formula (12) and formula (13), a plurality of candidate image packages may be screened, and a candidate image package whose entropy value is lower than a preset threshold of the entropy value is removed. A plurality of target image packages may be screened out from the plurality of candidate image packages, which is expressed as Bag={$\mathbb{B}_1$, $\mathbb{B}_2$, . . . , $\mathbb{B}_i$, . . . , $\mathbb{B}_{k'}$}, where k' is a quantity of the plurality of target image packages, k' being a positive integer.

Based on the above, a candidate image package whose entropy value is lower than the preset threshold of the entropy value is removed, that is, a candidate image package with higher stability is screened, which further reduces the amount of data processed in the process of searching for the WSI with the WSI, thereby improving search efficiency.

Based on the embodiment shown in FIG. 14, step 1405 may be replaced with 1405-2.

1405-2: Screen the at least one candidate image package according to similarities between the at least one candidate tissue image and the key images, to obtain the at least one target image package.

In some embodiments, for a first candidate image package that is in the at least one candidate image package and that corresponds to a first key image in the at least one key image, the at least one candidate tissue image in the first candidate image package is sorted in descending order of cosine similarities with the first key image; first m candidate tissue images of the first candidate image package are obtained; cosine similarities respectively corresponding to the first m candidate tissue images are calculated; a mean value of cosine similarities respectively corresponding to first m candidate tissue images of the plurality of candidate image packages is determined as a first mean value; and a candidate image package that includes the at least one candidate tissue image whose mean value of cosine similarities is greater than the first mean value is determined as the target image package, to obtain the at least one target image package, where the first candidate image package is any one of the at least one candidate image package, and m is a positive integer.

For example, the plurality of candidate image packages are represented as Bag={$\mathbb{B}_1$, $\mathbb{B}_2$, . . . , $\mathbb{B}_i$, . . . , $\mathbb{B}_k$}, candidate tissue images in each candidate image package are sorted in descending order of the cosine similarities, and the first mean value may be expressed as follows:

$$\eta = \frac{1}{k}\sum_{i=1}^{k} AveTop(\mathbb{B}_i); \tag{14}$$

$\mathbb{B}_i$ and k respectively represent the $i^{th}$ candidate image package and a total quantity of the plurality of candidate image packages, AveTop represents the mean value of the first m cosine similarities in the $i^{th}$ candidate image package, η is the first mean value, and n is used as an evaluation criterion to remove a candidate image package whose average cosine similarity is less than η, so that a plurality of target image packages may be obtained. The plurality of target image packages are expressed as Bag={$\mathbb{B}_1$, $\mathbb{B}_2$, . . . , $\mathbb{B}_i$, . . . , $\mathbb{B}_{k''}$}, where $\mathbb{B}_i$ and k" respectively represent the $i^{th}$ target image package and a total quantity of the plurality of target image packages, k" being a positive integer.

Based on the above, the candidate image package whose similarity to the key image is less than the first mean value is removed, that is, a candidate image package with a high similarity between the candidate tissue image and the key image are screened, which further reduces the amount of data processed in the process of searching for the WSI with the WSI, thereby improving search efficiency.

Steps 1405-1 and 1405-2 may be separately performed to screen the plurality of candidate image packages, or may be jointly performed to screen the plurality of candidate image packages. In this case, 1405-1 may be performed before 1405-2, or 1405-2 may be performed before 1405-1. This is not limited in this application.

Figure 15:
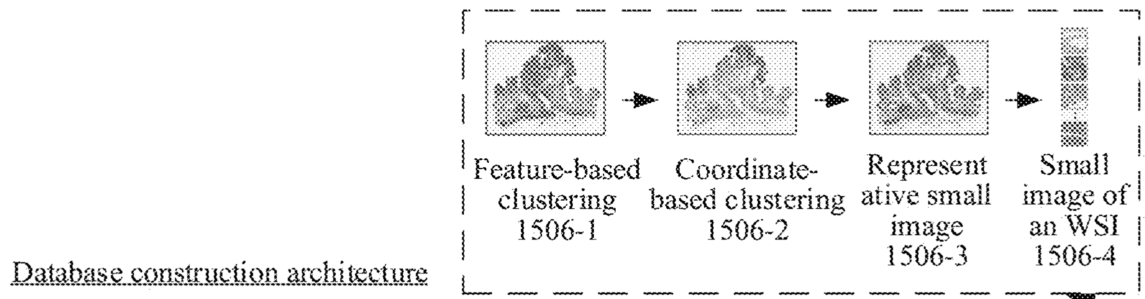
FIG. 15 is a schematic diagram of a database construction architecture according to an embodiment of this application.
Figure 15:
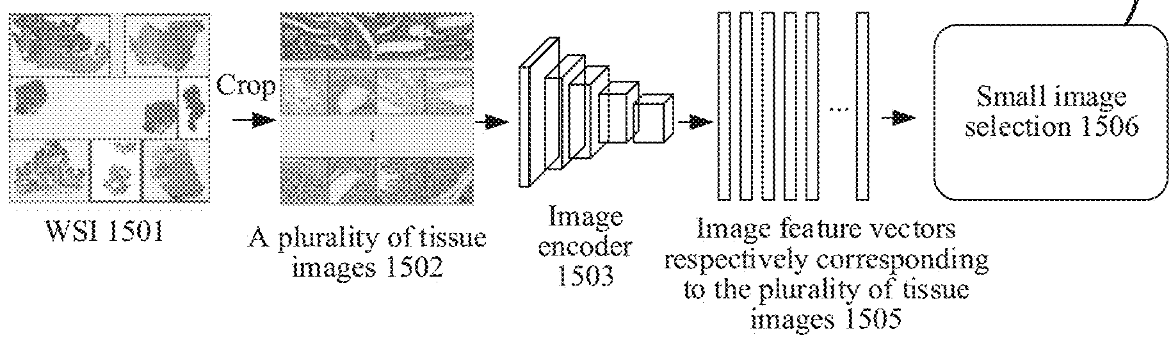

Based on the method embodiment shown in FIG. 14, step 1404 involves querying candidate image packages through the database, and a process for constructing the database is introduced below. FIG. 15 shows a schematic diagram of a database construction framework according to an exemplary embodiment of this application. The method is performed by a use device of an image encoder, or may be performed by another computer device other than the use device of the image encoder. This is not limited in this application.

Descriptions are provided by using one WSI as an example.

First, a WSI 1501 is cropped into a plurality of tissue images 1502. In some embodiments, the cropping method includes the following steps: In a WSI preprocessing phase, a foreground tissue region in the WSI is extracted by using a threshold technology, and then the foreground tissue region in the WSI is cropped into a plurality of tissue images based on a sliding window technology.

Then, the plurality of tissue images 1502 are inputted into an image encoder 1503, and feature extraction is performed on the plurality of tissue images 1502, to obtain image feature vectors 1505 respectively corresponding to the plurality of tissue images.

Finally, selection on the plurality of tissue images 1502 is performed (that is, small image selection 1506 is performed) based on the plurality of image feature vectors 1505 corresponding to the plurality of tissue images. In some embodiments, small image selection 1506 includes double clustering, where the first clustering is feature-based clustering 1506-1, and the second clustering is coordinate-based clustering 1506-2.

In feature-based clustering 1506-1, the plurality of image feature vectors 1505 of the plurality of tissue images are clustered into $K_1$ categories in a K-means clustering manner, and correspondingly, $K_1$ clustering centers are obtained. FIG. 15 shows a small image corresponding to one of the clustering centers.

In coordinate-based clustering 1506-2, for any one of $K_1$ categories, a plurality of feature vectors included in the category are clustered into $K_2$ categories in the K-means clustering manner, and correspondingly, $K_2$ clustering centers are obtained. FIG. 15 shows a small image corresponding to one of the clustering centers.

Small images corresponding to the $K_1$*$K_2$ clustering centers obtained through double clustering are used as representative small images 1506-3. FIG. 15 shows a small image corresponding to one of the clustering centers.

Use all representative small images as small images of the WSI to represent WSI. Based on this, a plurality of small images of one WSI are constructed.

Based on the above, construction of the database is similar to the process of searching for the WSI with the WSI, which is intended to determine a plurality of small images configured for representing one WSI, to support matching of large images by matching small images in the search process.

In some embodiments, the training idea of the image encoder may further be applied to another image field. Through a sample star field image (a small image), the star field image comes from a starry sky image (a large image). The star field image indicates a local region in the starry sky image. For example, the starry sky image is an image of a first range of starry sky, and the star field image is an image of a subrange within the first range.

The image encoder training phase includes the following steps:

obtaining a first sample star field image and a plurality of second sample star field images, the second sample star field images being negative samples in contrastive learning; performing data enhancement on the first sample star field image, to obtain a first image; and inputting the first image into a first image encoder, to obtain a first feature vector, the first image being a positive sample in the contrastive learning; performing data enhancement on the first sample star field image, to obtain a second image; and inputting the second image into a second image encoder, to obtain a second feature vector, the second image being an anchor image in the contrastive learning. inputting the plurality of second sample star field images into the first image encoder, to obtain feature vectors respectively corresponding to the plurality of second sample star field images; clustering the feature vectors respectively corresponding to the plurality of second sample star field images, to obtain a plurality of clustering centers; and generating a plurality of weights based on similarity values between the plurality of clustering centers and the first feature vector; generating, based on the first feature vector and the second feature vector, a first sub-function configured for representing an error between the anchor image and the positive sample; based on the second feature vector and the feature vectors respectively corresponding to the plurality of second sample star field images, generating, in combination with the plurality of weights, a second sub-function configured for representing an error between the anchor image and the negative sample; and generating a first weight loss function based on the first sub-function and the second sub-function; and training the first image encoder and the second image encoder based on the first weight loss function. The first image encoder is updated based on the second image encoder.

Similarly, an image encoder of the star field image may also adopt another training method similar to the method performed by the image encoder of the sample tissue image. Details are not described herein again.

The Image Encoder Use Phase Includes the Following Steps:

obtaining a starry sky image and cropping the starry sky images into a plurality of star field images; generating, through an image encoder, image feature vectors respectively corresponding to the plurality of star field images; clustering the image feature vectors respectively corresponding to the plurality of star field images, to determine at least one key image from the plurality of star field images; querying, based on image feature vectors respectively corresponding to the at least one key image, a database to obtain at least one candidate image package respectively corresponding to the at least one key image, the candidate image package including at least one candidate star field image; determining, according to an attribute of the at least one candidate image package, at least one target image package from the at least one candidate image package; and determining a starry sky image to which at least one candidate star field image included in the at least one target image package respectively belongs as a final search result.

In some other embodiments, the training idea of the image encoder may further be applied to the field of geographical images, and the image encoder is trained through a sample terrain image (a small image). The terrain image comes from a landform image (a large image), and the terrain image indicates a local region in the terrain image. For example, the terrain image is an image of a second range of terrain captured by the satellite, and the terrain image is an image of a subrange within the second range.

The image encoder training phase includes the following steps:

obtaining a first sample terrain image and a plurality of second sample terrain images, the second sample terrain images being negative samples in contrastive learning; performing data enhancement on the first sample terrain image, to obtain a first image; and inputting the first image into a first image encoder, to obtain a first feature vector, the first image being a positive sample in the contrastive learning; performing data enhancement on the first sample terrain image, to obtain a second image; and inputting the second image into a second image encoder, to obtain a second feature vector, the second image being an anchor image in the contrastive learning; inputting the plurality of second sample terrain images into the first image encoder, to obtain feature vectors respectively corresponding to the plurality of second sample terrain images; clustering the feature vectors respectively corresponding to the plurality of second sample terrain images, to obtain a plurality of clustering centers; and generating a plurality of weights based on similarity values between the plurality of clustering centers and the first feature vector; generating, based on the first feature vector and the second feature vector, a first sub-function configured for representing an error between the anchor image and the positive sample; based on the second feature vector and the feature vectors respectively corresponding to the plurality of second sample terrain images, generating, in combination with the plurality of weights, a second sub-function configured for representing an error between the anchor image and the negative sample; and generating a first weight loss function based on the first sub-function and the second sub-function; and training the first image encoder and the second image encoder based on the first weight loss function. The first image encoder is updated based on the second image encoder.

Similarly, an image encoder of the terrain image may also adopt another training method similar to the method performed by the image encoder of the sample tissue image. Details are not described herein again.

The Image Encoder Use Phase Includes the Following Steps:

obtaining a landform image and cropping the landform image into a plurality of terrain images; generating, through an image encoder, image feature vectors respectively corresponding to the plurality of terrain images; clustering the image feature vectors respectively corresponding to the plurality of terrain images, to determine at least one key image from the plurality of terrain images; querying, based on image feature vectors respectively corresponding to the at least one key image, a database to obtain at least one candidate image package respectively corresponding to the at least one key image, the candidate image package including at least one candidate terrain image; determining, according to an attribute of the at least one candidate image package, at least one target image package from the at least one candidate image package; and determining a landform image to which at least one candidate terrain image included in the at least one target image package respectively belongs as a final search result.

Figure 16:
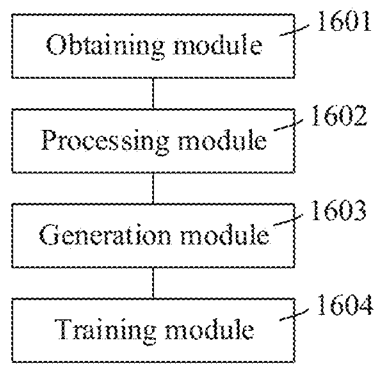
FIG. 16 is a structural block diagram of an image encoder training apparatus according to an embodiment of this application.

FIG. 16 is a structural block diagram of an image encoder training apparatus according to an exemplary embodiment of this application. The apparatus includes:

an obtaining module 1601, configured to obtain a first sample tissue image and a plurality of second sample tissue images, the second sample tissue images being negative samples in contrastive learning;

a processing module 1602, configured to perform data enhancement on the first sample tissue image, to obtain a first image; and input the first image into a first image encoder, to obtain a first feature vector, the first image being a positive sample in the contrastive learning;

the processing module 1602 being further configured to perform data enhancement on the first sample tissue image, to obtain a second image; and input the second image into a second image encoder, to obtain a second feature vector, the second image being an anchor image in the contrastive learning, and the second image being different from the first image;

the processing module 1602 being further configured to input the plurality of second sample tissue images into the first image encoder, to obtain feature vectors respectively corresponding to the plurality of second sample tissue images; cluster the feature vectors respectively corresponding to the plurality of second sample tissue images, to obtain a plurality of clustering centers; and generate a plurality of weights based on similarity values between the plurality of clustering centers and the first feature vector;

a generation module 1603, configured to generate, based on the first feature vector and the second feature vector, a first sub-function configured for representing an error between the anchor image and the positive sample; based on the second feature vector and the feature vectors respectively corresponding to the plurality of second sample tissue images, generate, in combination with the plurality of weights, a second sub-function configured for representing an error between the anchor image and the negative sample; and generate a first weight loss function based on the first sub-function and the second sub-function; and a training module 1604, configured to train the first image encoder and the second image encoder based on the first weight loss function.

In some embodiments, the processing module 1602 is further configured to: when the first sample tissue image belongs to a first sample tissue image in a first training batch, cluster the feature vectors respectively corresponding to the plurality of second sample tissue images, to obtain a plurality of clustering centers corresponding to the first training batch.

In some embodiments, the processing module 1602 is further configured to: when the first sample tissue image belongs to a first sample tissue image in an $n^{th}$ training batch, update a plurality of clustering centers corresponding to an $(n-1)^{th}$ training batch to a plurality of clustering centers corresponding to the $n^{th}$ training batch, n being a positive integer greater than 1.

In some embodiments, the processing module 1602 is further configured to: for a $j^{th}$ clustering center in the plurality of clustering centers in the $(n-1)^{th}$ training batch, update the $j^{th}$ clustering center in the $(n-1)^{th}$ training batch based on a first sample tissue image of a $j^{th}$ category in the $n^{th}$ training batch, to obtain a $j^{th}$ clustering center corresponding to the $n^{th}$ training batch, i being a positive integer.

In some embodiments, values of the weights are in a negative correlation with the similarity values between the clustering centers and the first feature vector; and for the $j^{th}$ clustering center in the plurality of clustering centers, feature vectors included in a category of the $j^{th}$ clustering center correspond to the same weight.

In some embodiments, the processing module 1602 is further configured to input the second image into the second image encoder, to obtain a first intermediate feature vector; and input the first intermediate feature vector into a first multilayer perceptron MLP, to obtain the second feature vector.

In some embodiments, the training module 1604 is further configured to update a parameter of the first image encoder in a weighting manner according to a parameter of the second image encoder.

In some embodiments, the processing module 1602 being further configured to perform data enhancement on the first sample tissue image, to obtain a third image; and input the third image into a third image encoder, to obtain a third feature vector, the third image being an anchor image in the contrastive learning, and the third image being different from the first image and the second image.

In some embodiments, the generation module 1603 is further configured to generate, based on the first feature vector and the third feature vector, a third sub-function configured for representing an error between the anchor image and the positive sample; based on the third feature vector and the feature vectors respectively corresponding to the plurality of second sample tissue images, generate, in combination with the plurality of weights, a fourth sub-function configured for representing an error between the anchor image and the negative sample; and generate a second weight loss function based on the third sub-function and the fourth sub-function.

In some embodiments, the training module 1604 is further configured to train the first image encoder and the third image encoder based on the second weight loss function.

In some embodiments, the processing module 1602 is further configured to input the third image into the third image encoder, to obtain a second intermediate feature vector; and input the second intermediate feature vector into a second MLP, to obtain the third feature vector.

In some embodiments, the training module 1604 is further configured to update, according to a parameter shared between the second image encoder and the third image encoder, a parameter of the first image encoder in a weighting manner.

Based on the above, weights are assigned to negative samples identified in the related art, and a "negative degree" of the negative samples is further distinguished between the negative samples, so that a loss value used in contrastive learning (also referred to as a contrastive learning paradigm)

can more accurately pull anchor images and the negative samples away from each other, and the impact of potential false negative samples is reduced, thereby better training an image encoder. In this way, the image encoder obtained through training can better distinguish different features between the anchor images and the negative samples, and a feature of a small image obtained through the image encoder can better represent the small image.

Figure 17:
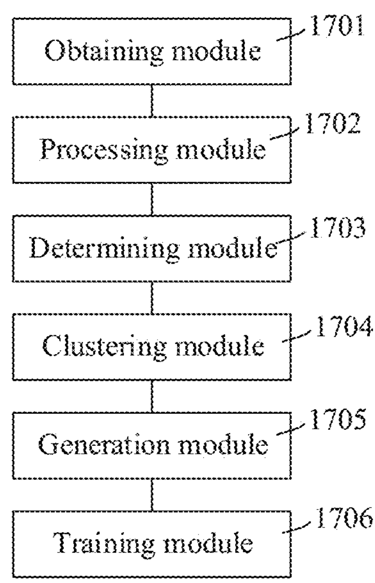
FIG. 17 is a structural block diagram of an image encoder training apparatus according to an embodiment of this application.

FIG. 17 is a structural block diagram of an image encoder training apparatus according to an exemplary embodiment of this application. The apparatus includes:

- an obtaining module 1701, configured to obtain a first sample tissue image;
- a processing module 1702, configured to perform data enhancement on the first sample tissue image, to obtain a second image; and input the second image into a second image encoder, to obtain a fourth feature vector;
- the processing module 1702 being further configured to perform data enhancement on the first sample tissue image, to obtain a third image; and input the third image into a third image encoder, to obtain a fifth feature vector;
- a determining module 1703, configured to determine the fourth feature vector as a contrastive vector for contrastive learning, and determine the fifth feature vector as an anchor vector for the contrastive learning;
- a clustering module 1704, configured to cluster a plurality of fourth feature vectors of different first sample tissue images, to obtain a plurality of first clustering centers; determine a feature vector that is in the plurality of first clustering centers and that has a maximum similarity value with the fifth feature vector as a positive sample vector in the plurality of fourth feature vectors; and determine a first remaining feature vector as a negative sample vector in the plurality of fourth feature vectors, where the first remaining feature vector is a feature vector other than the feature vector having the maximum similarity value with the fifth feature vector in the plurality of fourth feature vectors;
- a generation module 1705, configured to generate a fifth sub-function based on the fifth feature vector and the positive sample vector in the plurality of fourth feature vectors; generate a sixth sub-function based on the fifth feature vector and the negative sample vector in the plurality of fourth feature vectors; and generate a first group loss function based on the fifth sub-function and the sixth sub-function; and
- a training module 1706, configured to train the second image encoder and the third image encoder based on the first group loss function; and determine the third image encoder as an image encoder obtained through final training.

In some embodiments, the processing module 1702 is further configured to input the second image into the second image encoder, to obtain a first intermediate feature vector; and the first intermediate feature vector is inputted into a third MLP, to obtain the fourth feature vector.

In some embodiments, the processing module 1702 is further configured to input the third image into the third image encoder, to obtain a second intermediate feature vector; and the second intermediate feature vector is inputted into a fourth MLP, to obtain the fifth feature vector.

In some embodiments, the determining module 1703 is further configured to determine the fifth feature vector as a contrastive vector for contrastive learning, and determine the fourth feature vector as an anchor vector for the contrastive learning.

In some embodiments, the clustering module 1704 is further configured to cluster a plurality of fifth feature vectors of different first sample tissue images, to obtain a plurality of second clustering centers; determine a feature vector that is in the plurality of second clustering centers and that has a maximum similarity value with the fourth feature vector as a positive sample vector in the plurality of fifth feature vectors; and determine a second remaining feature vector as a negative sample vector in the plurality of fifth feature vectors, where the second remaining feature vector is a feature vector other than the feature vector having the maximum similarity value with the fourth feature vector in the plurality of fifth feature vectors.

In some embodiments, the generation module 1705 is further configured to generate a seventh sub-function based on the fourth feature vector and the positive sample vector in the plurality of fifth feature vectors; generate an eighth sub-function based on the fourth feature vector and the negative sample vector in the plurality of fifth feature vectors; and generate a second group loss function based on the seventh sub-function and the eighth sub-function.

In some embodiments, the training module 1706 is further configured to train the second image encoder and the third image encoder based on the second group loss function; and determine the second image encoder as an image encoder obtained through final training.

In some embodiments, the training module 1706 is further configured to update, according to a parameter shared between the second image encoder and the third image encoder, a parameter of the first image encoder in a weighting manner.

Based on the above, positive samples identified in the related art are further distinguished, and a "positive degree" of the positive samples is further distinguished between the positive samples, so that a loss value used in contrastive learning (also referred to as a contrastive learning paradigm) can more accurately pull anchor images and the positive samples close to each other, thereby better training an image encoder. In this way, the image encoder obtained through training can better learn a common feature between the anchor image and the positive sample.

Figure 18:
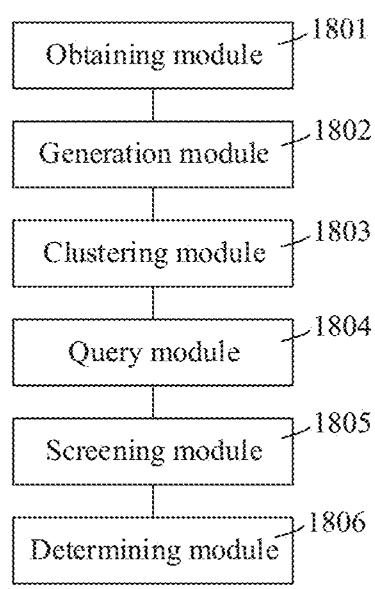
FIG. 18 is a structural block diagram of an apparatus for searching for a whole slide image according to an embodiment of this application.

FIG. 18 is a structural block diagram of an apparatus for searching for a whole slide image according to an exemplary embodiment of this application. The apparatus includes:

- an obtaining module 1801, configured to obtain a whole slide image, and crop the whole slide image into a plurality of tissue images;
- a generation module 1802, configured to generate, through an image encoder, image feature vectors respectively corresponding to the plurality of tissue images;
- a clustering module 1803, configured to cluster the image feature vectors respectively corresponding to the plurality of tissue images, to determine at least one key image from the plurality of tissue images;
- a query module 1804, configured to query, based on image feature vectors respectively corresponding to the at least one key image, a database to obtain at least one candidate image package respectively corresponding to the at least one key image, the candidate image package including at least one candidate tissue image;
- a screening module 1805, configured to determine, according to an attribute of the at least one candidate image package, at least one target image package from the at least one candidate image package; and
- a determining module 1806, configured to determine a whole slide image to which at least one candidate tissue image included in the at least one target image package respectively belongs as a final search result.

In some embodiments, the clustering module 1803 is further configured to cluster the image feature vectors respectively corresponding to the plurality of tissue images, to obtain a plurality of first class clusters; and determine clustering centers respectively corresponding to the plurality of first class clusters as image feature vectors respectively corresponding to the plurality of key images.

In some embodiments, the clustering module 1803 is further configured to: for a target first class cluster in the plurality of first class clusters, cluster based on location features of whole slide images to which a plurality of tissue images corresponding to the target first class cluster respectively belong, to obtain a plurality of second class clusters; and That clustering centers respectively corresponding to the plurality of first class clusters are determined as image feature vectors respectively corresponding to the plurality of key images includes: for the target first class cluster in the plurality of first class clusters, determining clustering centers respectively corresponding to the plurality of second class clusters included in the target first class cluster as the image feature vectors of the key images, where the target first class cluster is any one of the plurality of first class clusters.

In some embodiments, the screening module 1805 is further configured to screen the at least one candidate image package according to a quantity of diagnostic categories respectively included in the at least one candidate image package, to obtain the at least one target image package.

In some embodiments, the screening module 1805 is further configured to: for a first candidate image package that is in the at least one candidate image package and that corresponds to a first key image in the at least one key image, calculate an entropy value of the candidate image package based on a cosine similarity between at least one candidate tissue image in the first candidate image package and the first key image, an occurrence probability of at least one diagnostic category in the database, and a diagnostic category of the at least one candidate tissue image, where the entropy value is configured for measuring a quantity of diagnostic categories corresponding to the first candidate image package, and the first candidate image package is any one of the at least one candidate image package; and the at least one candidate image package is screened, to obtain the at least one target image package whose entropy value is less than an entropy value threshold.

In some embodiments, the screening module 1805 is further configured to screen the at least one candidate image package according to similarities between the at least one candidate tissue image and the key images, to obtain the at least one target image package.

In some embodiments, the screening module 1805 is further configured to: for a first candidate image package that is in the at least one candidate image package and that corresponds to a first key image in the at least one key image, sort the at least one candidate tissue image in the first candidate image package in descending order of cosine similarities with the first key image; obtain first m candidate tissue images of the first candidate image package; cosine similarities respectively corresponding to the first m candidate tissue images are calculated; determine a mean value of cosine similarities respectively corresponding to first m candidate tissue images of the plurality of candidate image packages as a first mean value; and determine a candidate image package that includes the at least one candidate tissue image whose mean value of cosine similarities is greater than the first mean value as the target image package, to obtain the at least one target image package, where the first candidate image package is any one of the at least one candidate image package, and m is a positive integer.

Based on the above, first, the WSI is cropped into a plurality of small images, and the plurality of small images are inputted into the image encoder to obtain a plurality of image feature vectors of the plurality of small images. The plurality of image feature vectors are clustered, and small images corresponding to clustering centers are used as key images. Next, the key images are queried to obtain candidate image packages. Then, the candidate image packages are screened to obtain the target image package. Finally, a WSI corresponding to at least one small image in the candidate image package is used as the final search result. The apparatus supports searching for a WSI (a large image) with a WSI (a large image), and the clustering module and the screening module mentioned can greatly reduce an amount of data processed and improve search efficiency. In addition, the apparatus for searching for the WSI (the large image) with the WSI (the large image) provided in this embodiment does not require a training process, and can achieve fast search and matching.

Figure 19:
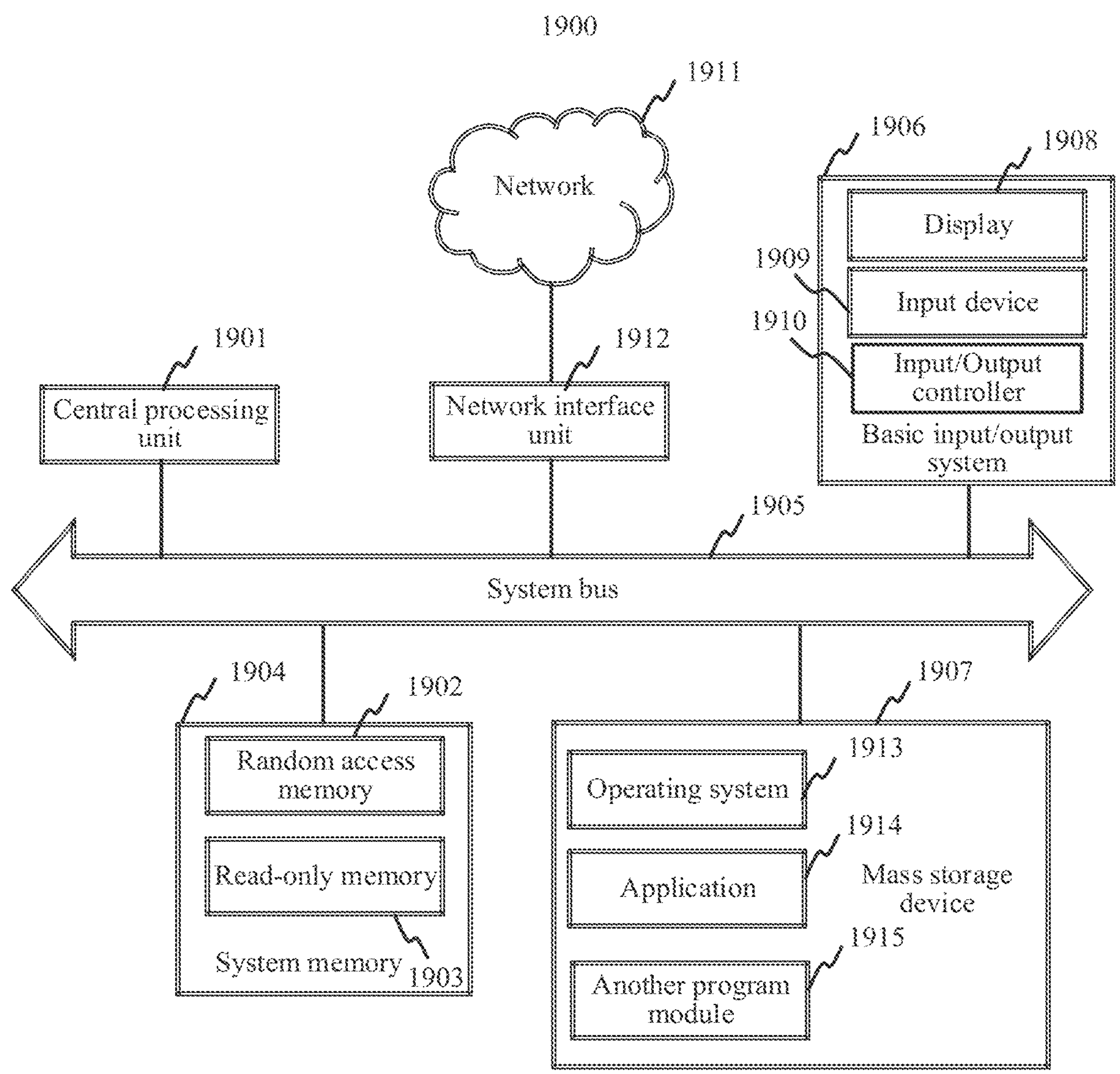
FIG. 19 is a structural block diagram of a computer device according to an embodiment of this application.

FIG. 19 is a schematic structural diagram of a computer device according to an exemplary embodiment. The computer device 1900 may be the training device 21 of the image encoder in FIG. 2, or may be the use device 22 of the image encoder in FIG. 2. The computer device 1900 includes a central processing unit (CPU) 1901, a system memory 1904 including a random access memory (RAM) 1902 and a read-only memory (ROM) 1903, and a system bus 1905 connecting the system memory 1904 to the CPU 1901. The computer device 1900 further includes a basic input/output system (I/O system) 1906 configured to transmit information between components in the computer device, and a mass storage device 1907 configured to store an operating system 1913, an application 1914, and other program module 1915.

The basic I/O system 1906 includes a display 1908 configured to display information and an input device 1909 such as a mouse or a keyboard that is configured to input information by a user. The display 1908 and the input device 1909 are both connected to the CPU 1901 by an input/output (I/O) controller 1910 connected to the system bus 1905. The basic I/O system 1906 may further include the I/O controller 1910 for receiving and processing an input from a plurality of other devices such as a keyboard, a mouse, or an electronic stylus. Similarly, the I/O controller 1910 further provides an output to a display screen, a printer, or another type of output device.

The mass storage device 1907 is connected to the CPU 1901 by using a mass storage controller (not shown) connected to the system bus 1905. The mass storage device 1907 and a computer device-readable medium associated with the mass storage device provide non-volatile storage to the computer device 1900. That is, the mass storage device 1907 may include a computer device-readable medium (not shown) such as a hard disk or a compact disc ROM (CD-ROM) drive.

In general, the computer device-readable medium may include a computer device storage medium and a communication medium. The computer device storage medium includes volatile and non-volatile, removable and non-removable media implemented by using any method or technology for storing information such as computer device-readable instructions, data structures, program modules, or other data. The computer device storage medium includes a RAM, a ROM, an erasable programmable ROM (EPROM), an electrically erasable programmable ROM (EEPROM), a CD-ROM, a digital video disc (DVD) or another optical memory, a magnetic cassette, a magnetic tape, a magnetic disk memory, or another magnetic storage device. Certainly, it is known to a person skilled in the art that the computer device storage medium is not limited to the foregoing types. The system memory 1904 and the mass storage device 1907 may be collectively referred to as a memory.

According to the various embodiments of the present disclosure, the computer device 1900 may further be connected, through a network such as the Internet, to a remote computer device on the network for running. That is, the computer device 1900 may be connected to a network 1911 by a network interface unit 1912 connected to the system bus 1905, or may be connected to another type of network or remote computer device system (not shown) by a network interface unit 1912.

The memory further includes one or more programs. The one or more programs are stored in the memory. The central processing unit 1901 executes the one or more programs to implement all or some steps of the image encoder training method described above.

This application further provides a non-transitory computer-readable storage medium, the storage medium storing at least one instruction, at least one program, a code set or an instruction set, and the at least one instruction, the at least one program, the code set or the instruction set being loaded and executed by the processor to implement the image encoder training method provided in the foregoing method embodiments.

This application provides a computer program product or a computer program. The computer program product or the computer program includes computer instructions, and the computer instructions are stored in a non-transitory computer-readable storage medium. A processor of a computer device reads the computer instructions from the computer-readable storage medium, and executes the computer instructions, to cause the computer device to perform the image encoder training method provided in the foregoing method embodiments.

The sequence numbers of the foregoing embodiments of this application are merely for description purpose but do not imply the preference among the embodiments. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that all or some of the steps of the foregoing embodiments may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for searching for a whole slide image, performed by a computer device, the method comprising:

cropping a query whole slide image into a plurality of tissue images;

generating, through an image encoder, image feature vectors respectively corresponding to the plurality of tissue images;

clustering the image feature vectors respectively corresponding to the plurality of tissue images, to generate a plurality of first class clusters;

determining clustering centers respectively corresponding to the plurality of first class clusters as image feature vectors respectively corresponding to at least one key image from the plurality of tissue images;

querying, based on the image feature vectors respectively corresponding to the at least one key image, a database to obtain at least one target image package corresponding to the at least one key image; and determining a target whole slide image to which at least one candidate tissue image comprised in the at least one target image package respectively belongs as a final search result.

2. The method according to claim 1, wherein the method further comprises:

for a target first class cluster in the plurality of first class clusters, clustering based on location features of whole slide images to which a plurality of tissue images corresponding to the target first class cluster respectively belong, to obtain a plurality of second class clusters; and for the target first class cluster in the plurality of first class clusters, determining clustering centers respectively corresponding to the plurality of second class clusters comprised in the target first class cluster as the image feature vectors of the at least one key image, wherein the target first class cluster is any one of the plurality of first class clusters.

3. The method according to claim 1, wherein the querying, based on the image feature vectors respectively corresponding to the at least one key image, a database to obtain at least one target image package corresponding to the at least one key image comprises:

screening at least one candidate image package according to quantities of diagnostic categories respectively comprised in the at least one candidate image package, to obtain the at least one target image package.

4. The method according to claim 3, wherein the screening at least one candidate image package according to quantities of diagnostic categories respectively comprised in the at least one candidate image package, to obtain the at least one target image package comprises:

for a first candidate image package that is in the at least one candidate image package and that corresponds to a first key image in the at least one key image, calculating an entropy value of the first candidate image package based on a cosine similarity between at least one candidate tissue image in the first candidate image package and the first key image, an occurrence probability of at least one diagnostic category in the database, and a diagnostic category of the at least one candidate tissue image, wherein the entropy value is configured for measuring a quantity of diagnostic categories corresponding to the first candidate image package, and the first candidate image package is any one of the at least one candidate image package; and screening the at least one candidate image package, to obtain the at least one target image package whose entropy value is less than an entropy value threshold.

5. The method according to claim 1, wherein the querying, based on the image feature vectors respectively corresponding to the at least one key image, a database to obtain at least one target image package corresponding to the at least one key image comprises:

screening at least one candidate image package according to similarities between the at least one candidate tissue image and the at least one key image, to obtain the at least one target image package.

6. The method according to claim 5, wherein the screening at least one candidate image package according to similarities between the at least one candidate tissue image and the at least one key image, to obtain the at least one target image package comprises:

for a first candidate image package that is in the at least one candidate image package and that corresponds to a first key image in the at least one key image, sorting the at least one candidate tissue image in the first candidate image package in descending order of cosine similarities with the first key image; obtaining first m candidate tissue images of the first candidate image package; and calculating cosine similarities respectively corresponding to the first m candidate tissue images;

determining a mean value of cosine similarities respectively corresponding to first m candidate tissue images of the at least one candidate image package as a first mean value; and determining a candidate image package that comprises the at least one candidate tissue image whose mean value of cosine similarities is greater than the first mean value as the target image package, to obtain the at least one target image package, wherein the first candidate image package is any one of the at least one candidate image package, and m is a positive integer.

7. A computer device, comprising a processor and a memory, the memory having a computer program stored therein, the computer program being loaded and executed by the processor and causing the computer device to implement a method for searching for a whole slide image including:

cropping a query whole slide image into a plurality of tissue images;

generating, through an image encoder, image feature vectors respectively corresponding to the plurality of tissue images;

clustering the image feature vectors respectively corresponding to the plurality of tissue images, to generate a plurality of first class clusters;

determining clustering centers respectively corresponding to the plurality of first class clusters as image feature vectors respectively corresponding to at least one key image from the plurality of tissue images;

querying, based on the image feature vectors respectively corresponding to the at least one key image, a database to obtain at least one target image package corresponding to the at least one key image; and determining a target whole slide image to which at least one candidate tissue image comprised in the at least one target image package respectively belongs as a final search result.

8. The computer device according to claim 7, wherein the method further comprises:

for a target first class cluster in the plurality of first class clusters, clustering based on location features of whole slide images to which a plurality of tissue images corresponding to the target first class cluster respectively belong, to obtain a plurality of second class clusters; and for the target first class cluster in the plurality of first class clusters, determining clustering centers respectively corresponding to the plurality of second class clusters comprised in the target first class cluster as the image feature vectors of the at least one key image, wherein the target first class cluster is any one of the plurality of first class clusters.

9. The computer device according to claim 7, wherein the querying, based on the image feature vectors respectively corresponding to the at least one key image, a database to obtain at least one target image package corresponding to the at least one key image comprises:

screening at least one candidate image package according to quantities of diagnostic categories respectively comprised in the at least one candidate image package, to obtain the at least one target image package.

10. The computer device according to claim 9, wherein the screening at least one candidate image package according to quantities of diagnostic categories respectively comprised in the at least one candidate image package, to obtain the at least one target image package comprises:

for a first candidate image package that is in the at least one candidate image package and that corresponds to a first key image in the at least one key image, calculating an entropy value of the first candidate image package based on a cosine similarity between at least one candidate tissue image in the first candidate image package and the first key image, an occurrence probability of at least one diagnostic category in the database, and a diagnostic category of the at least one candidate tissue image, wherein the entropy value is configured for measuring a quantity of diagnostic categories corresponding to the first candidate image package, and the first candidate image package is any one of the at least one candidate image package; and screening the at least one candidate image package, to obtain the at least one target image package whose entropy value is less than an entropy value threshold.

11. The computer device according to claim 7, wherein the querying, based on the image feature vectors respectively corresponding to the at least one key image, a database to obtain at least one target image package corresponding to the at least one key image comprises:

screening at least one candidate image package according to similarities between the at least one candidate tissue image and the at least one key image, to obtain the at least one target image package.

12. The computer device according to claim 11, wherein the screening at least one candidate image package according to similarities between the at least one candidate tissue image and the at least one key image, to obtain the at least one target image package comprises:

for a first candidate image package that is in the at least one candidate image package and that corresponds to a first key image in the at least one key image, sorting the at least one candidate tissue image in the first candidate image package in descending order of cosine similarities with the first key image; obtaining first m candidate tissue images of the first candidate image package; and calculating cosine similarities respectively corresponding to the first m candidate tissue images;

determining a mean value of cosine similarities respectively corresponding to first m candidate tissue images of the at least one candidate image package as a first mean value; and determining a candidate image package that comprises the at least one candidate tissue image whose mean value of cosine similarities is greater than the first mean value as the target image package, to obtain the at least one target image package, wherein the first candidate image package is any one of the at least one candidate image package, and m is a positive integer.

13. A non-transitory computer-readable storage medium, having a computer program stored therein, the computer program being loaded and executed by a processor of a computer device and causing the computer device to implement a method for searching for a whole slide image including:

cropping a query whole slide image into a plurality of tissue images;

generating, through an image encoder, image feature vectors respectively corresponding to the plurality of tissue images;

clustering the image feature vectors respectively corresponding to the plurality of tissue images, to generate a plurality of first class clusters;

determining clustering centers respectively corresponding to the plurality of first class clusters as image feature vectors respectively corresponding to at least one key image from the plurality of tissue images;

querying, based on the image feature vectors respectively corresponding to the at least one key image, a database to obtain at least one target image package corresponding to the at least one key image; and determining a target whole slide image to which at least one candidate tissue image comprised in the at least one target image package respectively belongs as a final search result.

14. The non-transitory computer-readable storage medium according to claim 13, wherein the method further comprises:

for a target first class cluster in the plurality of first class clusters, clustering based on location features of whole slide images to which a plurality of tissue images corresponding to the target first class cluster respectively belong, to obtain a plurality of second class clusters; and for the target first class cluster in the plurality of first class clusters, determining clustering centers respectively corresponding to the plurality of second class clusters comprised in the target first class cluster as the image feature vectors of the at least one key image, wherein the target first class cluster is any one of the plurality of first class clusters.

15. The non-transitory computer-readable storage medium according to claim 13, wherein the querying, based on the image feature vectors respectively corresponding to the at least one key image, a database to obtain at least one target image package corresponding to the at least one key image comprises:

screening at least one candidate image package according to quantities of diagnostic categories respectively comprised in the at least one candidate image package, to obtain the at least one target image package.

16. The non-transitory computer-readable storage medium according to claim 15, wherein the screening at least one candidate image package according to quantities of diagnostic categories respectively comprised in the at least one candidate image package, to obtain the at least one target image package comprises:

for a first candidate image package that is in the at least one candidate image package and that corresponds to a first key image in the at least one key image, calculating an entropy value of the first candidate image package based on a cosine similarity between at least one candidate tissue image in the first candidate image package and the first key image, an occurrence probability of at least one diagnostic category in the database, and a diagnostic category of the at least one candidate tissue image, wherein the entropy value is configured for measuring a quantity of diagnostic categories corresponding to the first candidate image package, and the first candidate image package is any one of the at least one candidate image package; and screening the at least one candidate image package, to obtain the at least one target image package whose entropy value is less than an entropy value threshold.

17. The non-transitory computer-readable storage medium according to claim 13, wherein the querying, based on the image feature vectors respectively corresponding to the at least one key image, a database to obtain at least one target image package corresponding to the at least one key image comprises:

screening at least one candidate image package according to similarities between the at least one candidate tissue image and the at least one key image, to obtain the at least one target image package.

* * * * *